(12) United States Patent
Ciou et al.

(10) Patent No.: US 9,606,679 B2
(45) Date of Patent: Mar. 28, 2017

(54) TOUCH PANEL AND MANUFACTURING METHOD THEREOF AND TOUCH DISPLAY PANEL

(71) Applicant: Industrial Technology Research Institute, Hsinchu (TW)

(72) Inventors: Jyun-Kai Ciou, Changhua County (TW); Chia-Sheng Huang, Yilan County (TW); Su-Tsai Lu, Hsinchu (TW); Ching-Chih Wei, Hsinchu (TW); Heng-Tien Lin, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 355 days.

(21) Appl. No.: 14/133,655

(22) Filed: Dec. 19, 2013

(65) Prior Publication Data

US 2014/0313160 A1    Oct. 23, 2014

(30) Foreign Application Priority Data

Apr. 23, 2013 (TW) .............................. 102114377 A

(51) Int. Cl.
*G06F 3/044* (2006.01)
(52) U.S. Cl.
CPC .... *G06F 3/044* (2013.01); *G06F 2203/04103* (2013.01); *G06F 2203/04113* (2013.01)
(58) Field of Classification Search
CPC ........... G06F 3/044; G06F 2203/04103; G06F 2203/04113
See application file for complete search history.

(56) References Cited

U.S. PATENT DOCUMENTS

| 6,917,358 B2 | 7/2005 | Cheng |
| 7,023,429 B2 | 4/2006 | Katakami |

(Continued)

FOREIGN PATENT DOCUMENTS

| CN | 102778773 | 11/2012 |
| KR | 1300693 | 8/2013 |

(Continued)

OTHER PUBLICATIONS

Gediminas Raciukaitis, et al., "Patterning of indium-tin oxide on glass with picosecond lasers," Applied Surface Science, Feb. 1, 2007, pp. 6570-6574.

(Continued)

*Primary Examiner* — Viet Pham
*Assistant Examiner* — Maheen Javed
(74) *Attorney, Agent, or Firm* — Jianq Chyun IP Office

(57) ABSTRACT

A touch panel and a manufacturing method thereof and a touch display panel are provided. The touch panel includes a substrate, at least one first conductive line, an insulating layer, and at least one second conductive line. The substrate has a sensing region and a periphery region. The first conductive line is disposed on the periphery region. The insulating layer is disposed on the periphery region and covers the first conductive line. The second conductive line is disposed on the periphery region. The first conductive line and the second conductive line are electrically insulated to each other. A portion of at least one second conductive line is disposed on the insulating layer located above the first conductive line.

21 Claims, 29 Drawing Sheets

(56) References Cited

U.S. PATENT DOCUMENTS

| | | | |
|---|---|---|---|
| 8,258,914 | B2 | 9/2012 | Kimura et al. |
| 8,264,469 | B2 | 9/2012 | Kimura et al. |
| 2011/0134070 | A1* | 6/2011 | Wang .................. G06F 3/041 345/174 |
| 2012/0032898 | A1 | 2/2012 | Li et al. |
| 2012/0235927 | A1 | 9/2012 | Ho et al. |
| 2013/0050107 | A1 | 2/2013 | Xie et al. |
| 2013/0314625 | A1* | 11/2013 | Tsai .................... G06F 3/044 349/12 |
| 2014/0240616 | A1* | 8/2014 | Huang ................ G06F 1/1692 349/12 |

FOREIGN PATENT DOCUMENTS

| | | |
|---|---|---|
| TW | 201209661 | 3/2012 |
| TW | 201211840 | 3/2012 |
| TW | M461101 | 9/2013 |
| TW | 201347125 | 11/2013 |
| TW | 201419059 | 5/2014 |

OTHER PUBLICATIONS

D. Ashkenasi, et al., "Fundamentals and advantages of ultrafast micro-structuring of transparent materials," Applied Physics A, May 28, 2003, pp. 223-228.

J. Hermann, et al., "Selective ablation of thin films with short and ultrashort laser pulses," Applied Surface Science, Nov. 2, 2005, pp. 4814-4818.

O. Yavas and M. Takai, "High-speed maskless laser patterning of thin films for giant microelectronics," Microprocesses and Nano-technology Conference on Microprocesses and Nanotechnology, Digest of Papers, Jul. 6-8, 1999, pp. 172-173.

O. Yavas, et al., "Substrate-assisted laser patterning of indium tin oxide thin films," Applied Physics A, Dec. 28, 1999, pp. S875-S878.

"Office Action of Taiwan Counterpart Application", issued on Aug. 12, 2015, p. 1-p. 11.

* cited by examiner

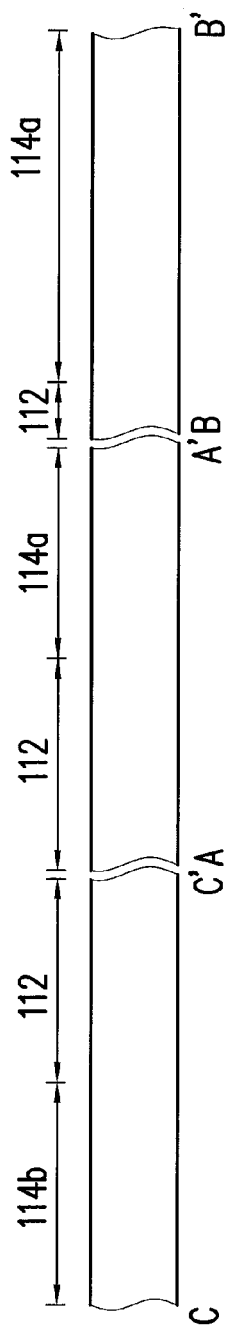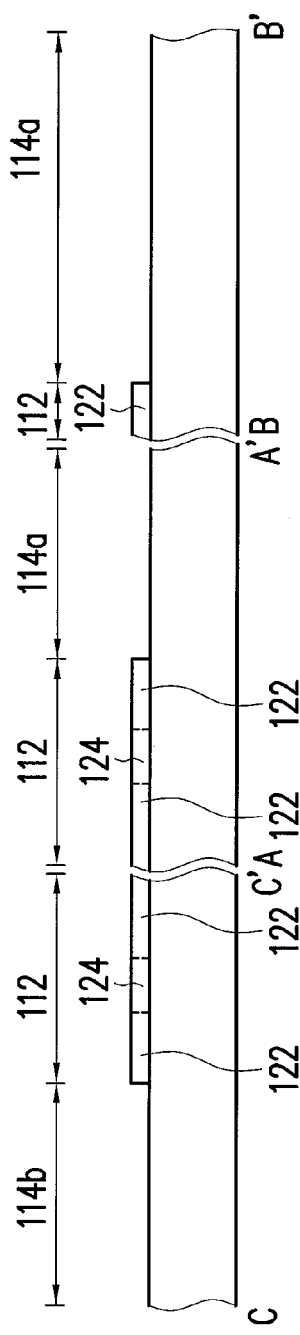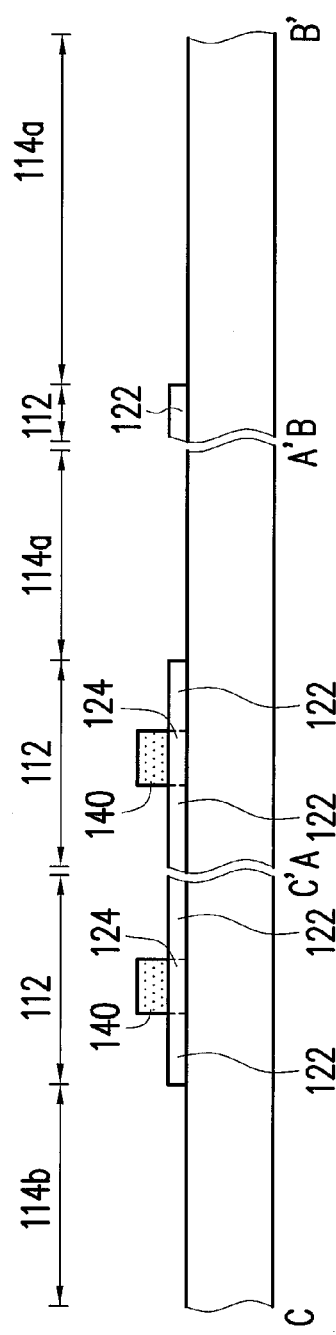

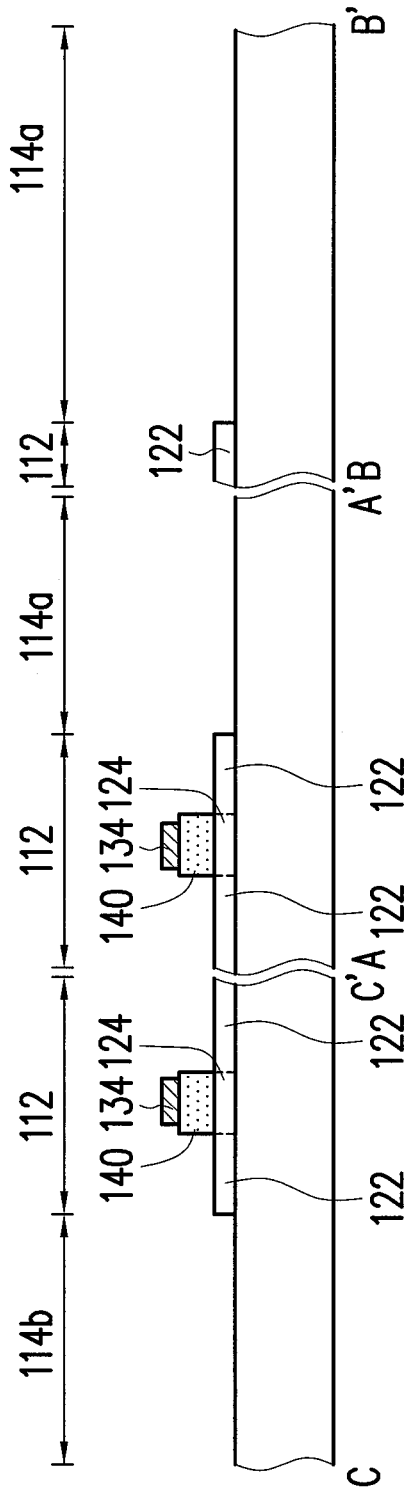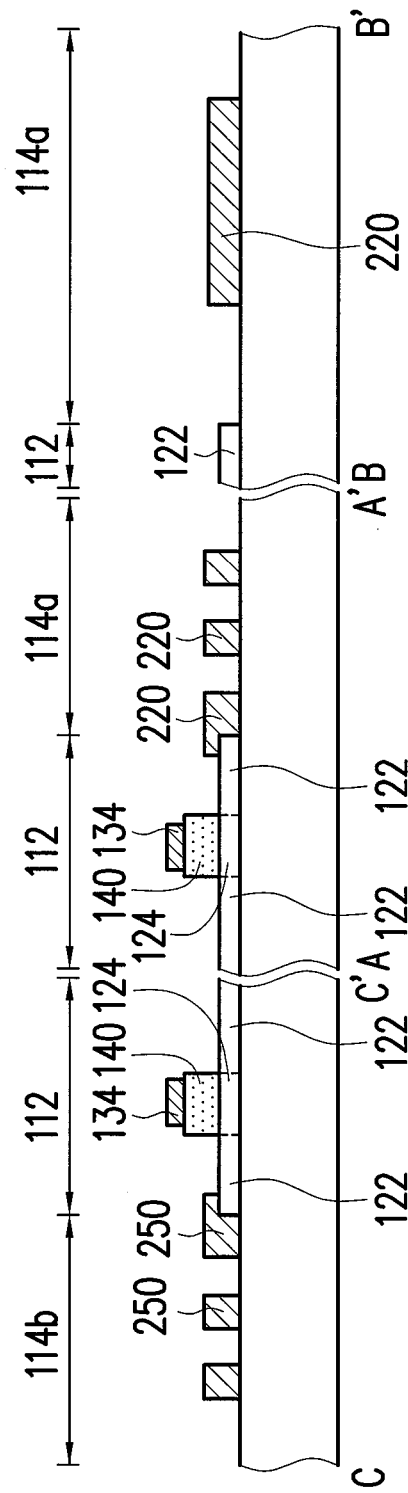

TOUCH PANEL AND MANUFACTURING METHOD THEREOF AND TOUCH DISPLAY PANEL

CROSS-REFERENCE TO RELATED APPLICATION

This application claims the priority benefit of Taiwan application serial no. 102114377, filed on Apr. 23, 2013. The entirety of the above-mentioned patent application is hereby incorporated by reference herein and made a part of this specification.

BACKGROUND

Technical Field

The disclosure relates to a touch panel and a manufacturing method thereof and a touch display panel.

Description of Related Art

A touch panel is a communication interface commonly used between a human and machinery equipment nowadays. An operation method thereof includes directly touching the touch panel with fingers or a stylus, and after a position of touch point is calculated by an internal mechanism, a calculated result is transmitted to an information equipment so as to accomplish a purpose of inputting. Adoption of the touch panel may reduce a communicating obstruction between the human and machinery equipment, so that a user may interact with a machine through most direct method possible. Accordingly, use of the touch panel as the inputting method is becoming one of the mainstream technologies for various information products in the future, such as vehicular navigations, game consoles, public information systems (e.g., vending machine, automated teller machine, navigation system), industry purposes, small electronic products (e.g., smart phones, e-books) and so on. The touch panel may be generally classified into capacitive, resistive, infrared, and ultrasonic touch panels, and among which, the resistive touch panel and the capacitive touch panel are of the most common product. In the capacitive touch panel, the facilitation of multi-touch provides much convenient operation mode so that the capacitive touch panel is popular in the market.

Currently, in order to satisfy requirements in external design, a display panel is usually required to include a relatively larger display plane, leading to a trend in technical development of a slim bezel. As to act in concert with design requirements in slim bezel for the display panel, the touch panel also demands for design requirements in slim bezel accordingly.

The current fabrication process of the sensing region involves disposing a layer of conductive material on the substrate and removes undesired part of the conductive material through laser. In other words, other than trenches within the sensing region, conductive material in the periphery region is also subject to removal. Removing the conductive material in the periphery region is a very time consuming process, causing such process to be ineffective during mass production.

SUMMARY

A touch panel is provided according to an embodiment of the disclosure. The touch panel includes a substrate, at least one first conductive line, an insulating layer, and at least one second conductive line. The substrate includes a sensing region and a periphery region surrounding the sensing region. The first conductive line is disposed on the periphery region. The insulating layer is disposed on the periphery region and covers the first conductive line. The second conductive line is disposed on the periphery region. The first conductive line and the second conductive line are electrically insulated to each other. A portion of at least one the second conductive line is disposed on the insulating layer located above the first conductive line.

A touch display panel is further provided according to an embodiment of the disclosure. The touch display panel includes above-said touch panel and a display panel. The touch panel is disposed on the display panel, and the touch panel and the display panel are assembled together.

A manufacturing method of a touch panel is further provided according to an embodiment of the disclosure. A substrate is provided. The substrate includes a sensing region and a periphery region surrounding the sensing region. At least one first conductive line is formed on the periphery region. The first conductive line is electrically connected to one of first sensing strings. An insulating layer is formed on the periphery region, and the insulating layer covers the first conductive line. At least one second conductive line is formed on the periphery region. A portion of at least one the second conductive line is disposed on the insulating layer located above the first conductive line. The first conductive line and the second conductive line are electrically insulated to each other.

A touch panel is provided according to an embodiment of the disclosure. The touch panel includes a substrate, a sensing device layer, a periphery pattern, a first insulating layer, and at least one first conductive line. The substrate includes a sensing region and a periphery region surrounding the sensing region. The sensing device layer is disposed in the sensing region and the periphery pattern is disposed in the periphery region. The first insulating layer is disposed on the periphery region and covers the periphery pattern located in the periphery region. The first conductive line is disposed on the first insulating layer in the periphery region and electrically connected to the sensing device layer.

A manufacturing method of a touch panel is further provided according to an embodiment of the disclosure. A substrate is provided. The substrate includes a sensing region and a periphery region surrounding the sensing region. A sensing device layer is formed in the sensing region and a periphery pattern is formed in the periphery region. A first insulating layer is formed on the periphery region to cover the periphery pattern. At least one first conductive line is formed on the first insulating layer located in the periphery region. The first conductive line is electrically connected to the sensing device layer.

To make the above features and advantages of the present disclosure more comprehensible, several embodiments accompanied with drawings are described in detail as follows.

BRIEF DESCRIPTION OF THE DRAWINGS

FIG. 3A to FIG. 3G are schematic cross-sectional views along lines A-A', B-B' and C-C' depicted in FIG. 2A to FIG. 2G, respectively.

DETAILED DESCRIPTION

Figure 1:
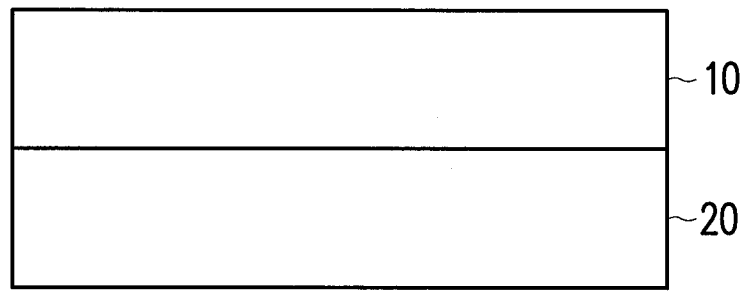
FIG. 1 is a schematic view of a touch display panel according to an embodiment of the disclosure.

FIG. 1 is a schematic view of a touch display panel according to an embodiment of the disclosure. A touch display panel 1 includes a touch panel 10 and a display panel 20. The touch panel 10 is disposed on the display panel 20, and the touch panel 10 and the display panel 20 are assembled together. In addition, the display panel 20 is, for example, an organic electro-luminescence display panel, a plasma display panel, a liquid crystal display panel, an electronic paper display panel, an electrowetting display panel, an electrophoretic display panel, or a hybrid display panel. A manufacturing process of the touch panel 10 is as described below.

Figure 2A:
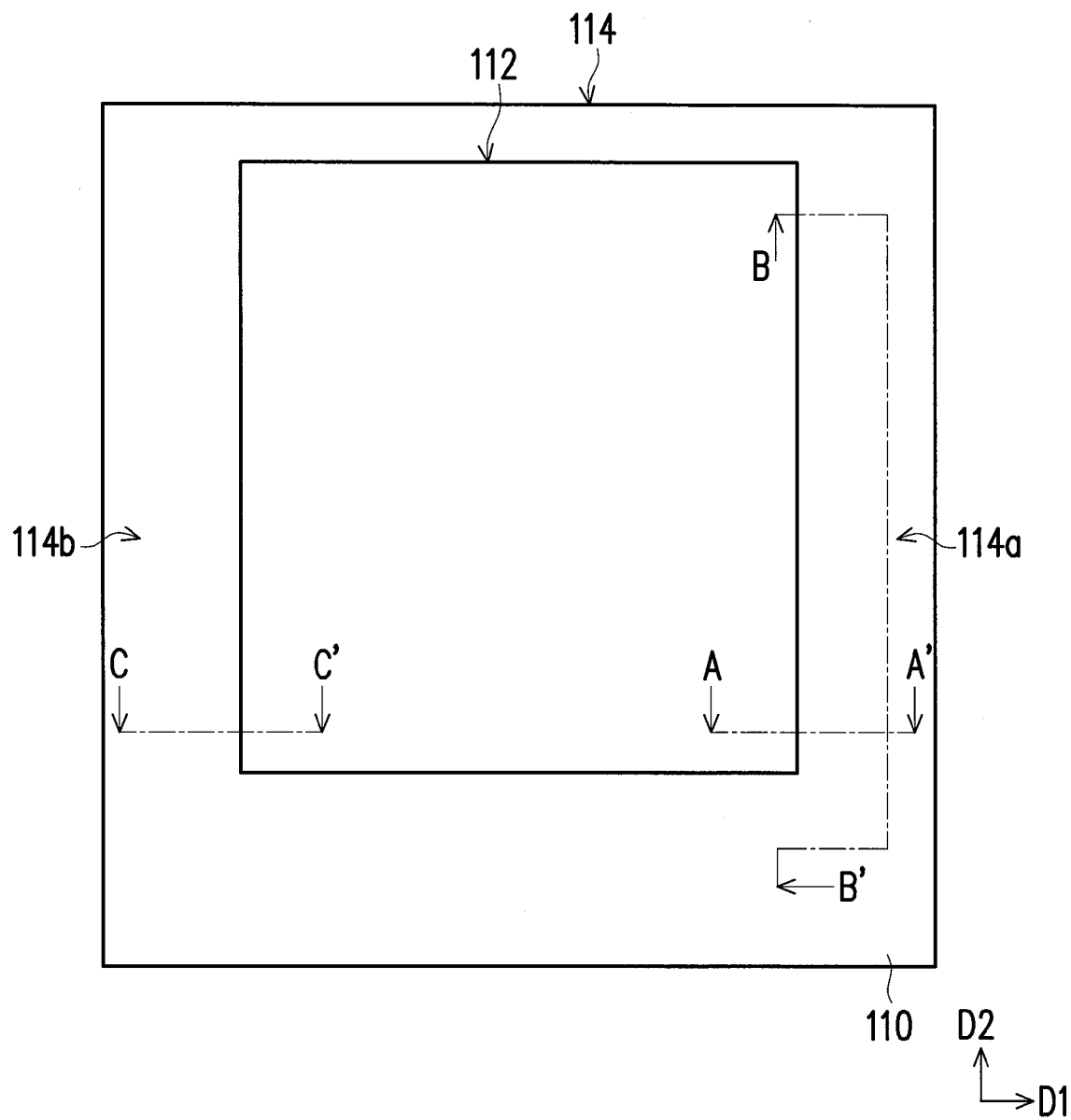
FIG. 2A to FIG. 2G are schematic top views of a manufacturing process of a touch panel according to an embodiment of the disclosure.

FIG. 2A to FIG. 2G are schematic top views of a manufacturing process of a touch panel according to an embodiment of the disclosure. FIG. 3A to FIG. 3G are schematic cross-sectional views along lines A-A', B-B' and C-C' depicted in FIG. 2A to FIG. 2G, respectively. Referring to FIG. 2A and FIG. 3A, a substrate 110 is provided. The substrate 110 includes a sensing region 112 and a periphery region 114, and the periphery region 114 is disposed to surround the sensing region 112. The sensing region 112 is used to dispose a sensing device layer, such as a display region corresponding to a display device. The periphery region 114 is used to dispose periphery circuits, such as a non-display region corresponding to the display device. The substrate 110 may be a rigid substrate or a flexible substrate, and the substrate 110 may also has an insulating layer or a buffer layer thereon.

The periphery region 114 includes a first region 114a and a second region 114b. The first region 114a and the second region 114b are disposed on two opposite sides of the sensing region 112, respectively. A material of the substrate 110 is, for example, a glass or a plastic. For example, a circuit board 300 is disposed on the periphery region 114 of the substrate 110. The circuit board 300 may be electrically connected to the circuits in the periphery region 114 in subsequent processes. The circuit board 300 is, for example, a flexible printed circuit (FPC) capable of electrically connecting the touch panel 10 to a driving chip (not illustrated).

Figure 2B:
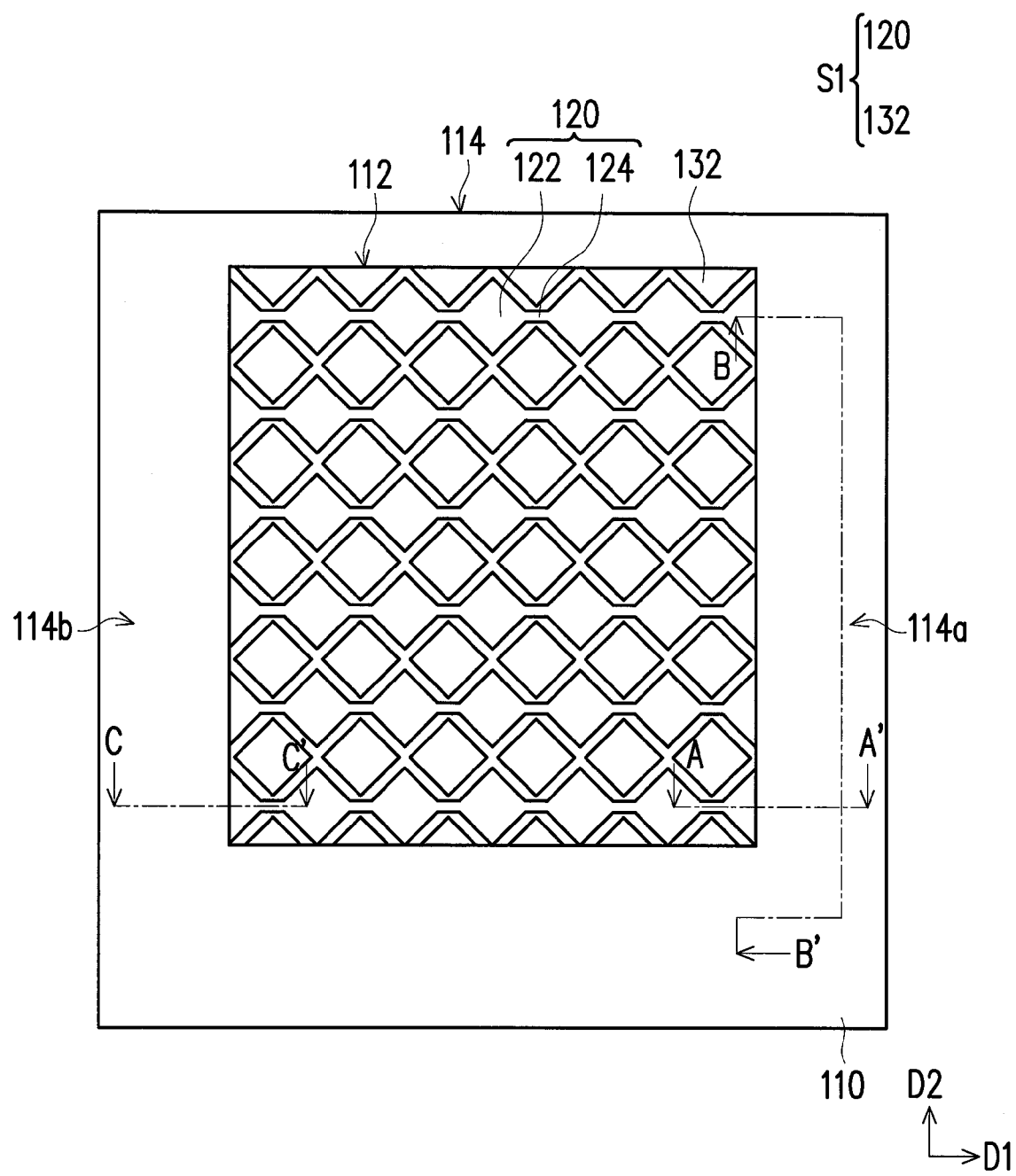
Figure 3F:
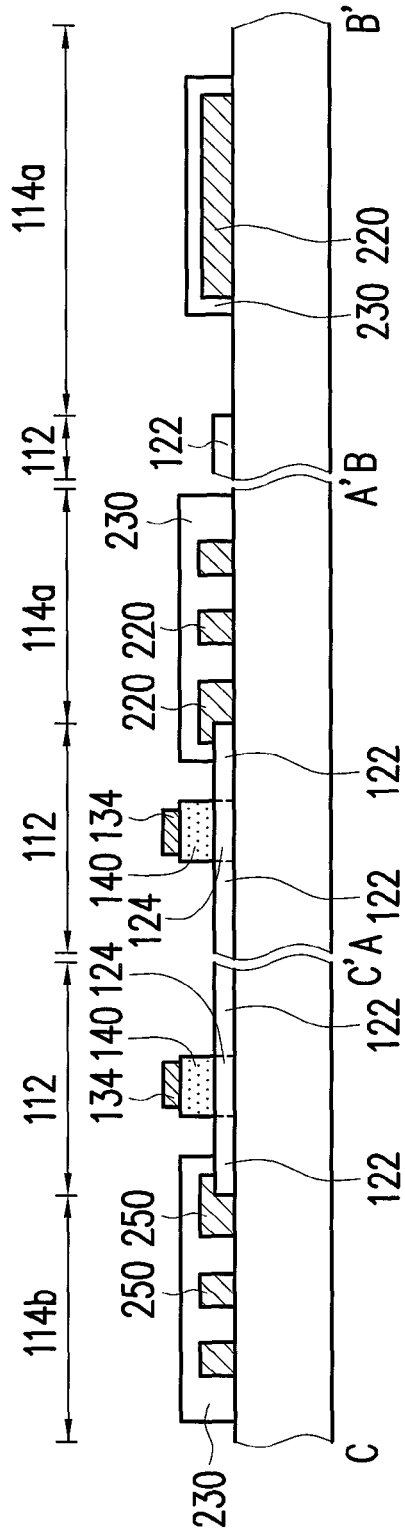

Referring to FIG. 2B and FIG. 3B, a first sensing conductive layer S1 is formed on the sensing region 112. The first sensing conductive layer S1 includes at least one first sensing string 120 and a plurality of second sensing pads 132. The first sensing string 120 includes a plurality of first sensing pads 122 and at least one first bridging line 124. The first bridging line 124 is electrically connected to two adjacent first sensing pads 122 to form one of the first sensing strings 120. The first sensing string 120 is extended along a first direction D1, and the adjacent first sensing strings 120 are electrically insulated from one another. A material of the first sensing conductive layer S1 is, for example, a transparent conductive material, conductive metal oxide, an organic conductive material, a nano-metal, a graphene, or a carbon nanotube. A method of forming the first sensing conductive layer S1 includes, for example, a film deposition, a screen printing, a photolithography process, an ink-jet printing, a transfer printing, or a roll to roll printing process.

Figure 2C:
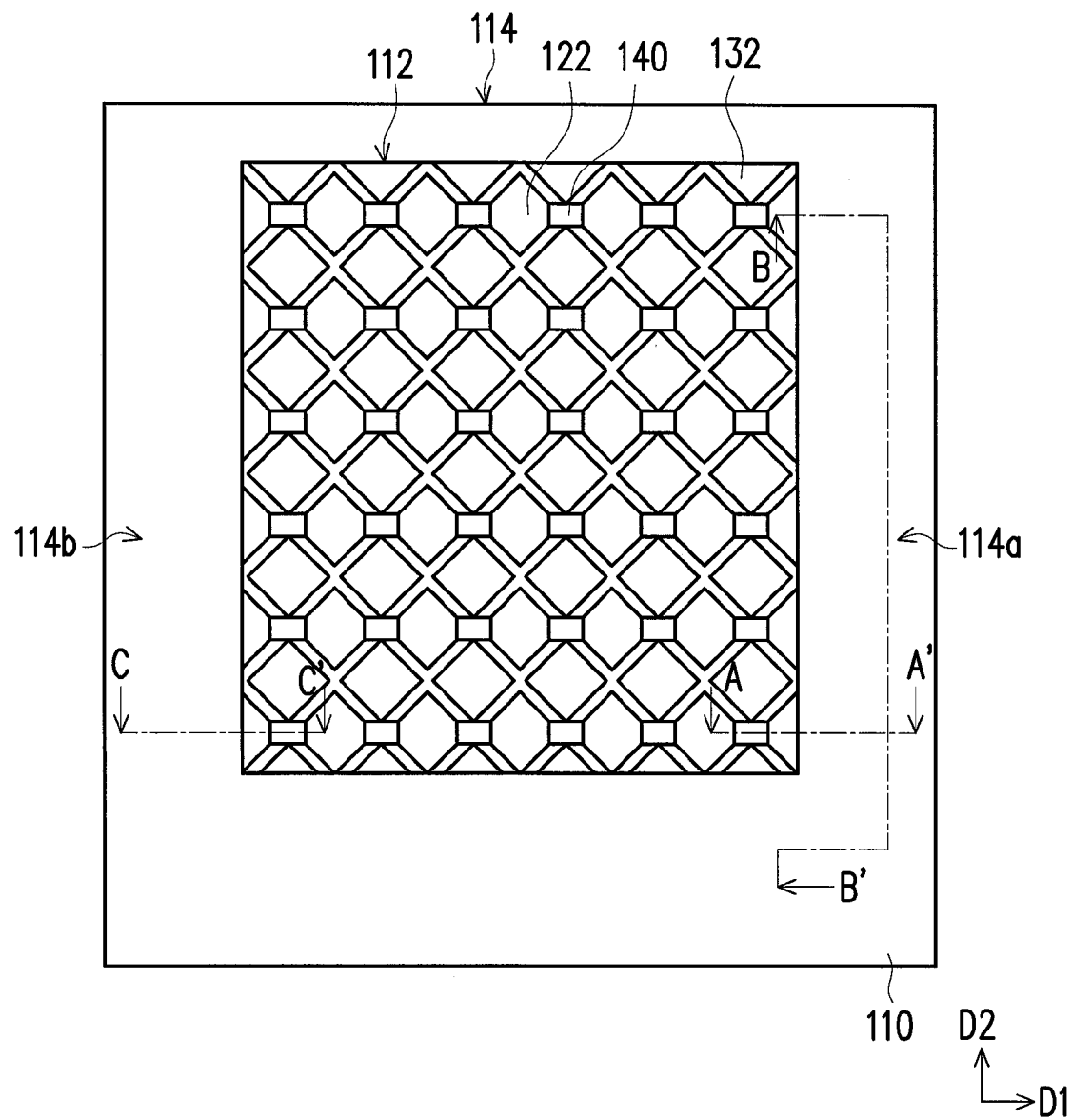

Referring to FIG. 2C and FIG. 3C, a plurality of insulation patterns 140 are formed on the sensing region 112. The insulation patterns 140 cover the first bridging lines 124. A material of the insulation patterns 140 is, for example, a photosensitive resin or a thermoset resin.

Figure 2D:
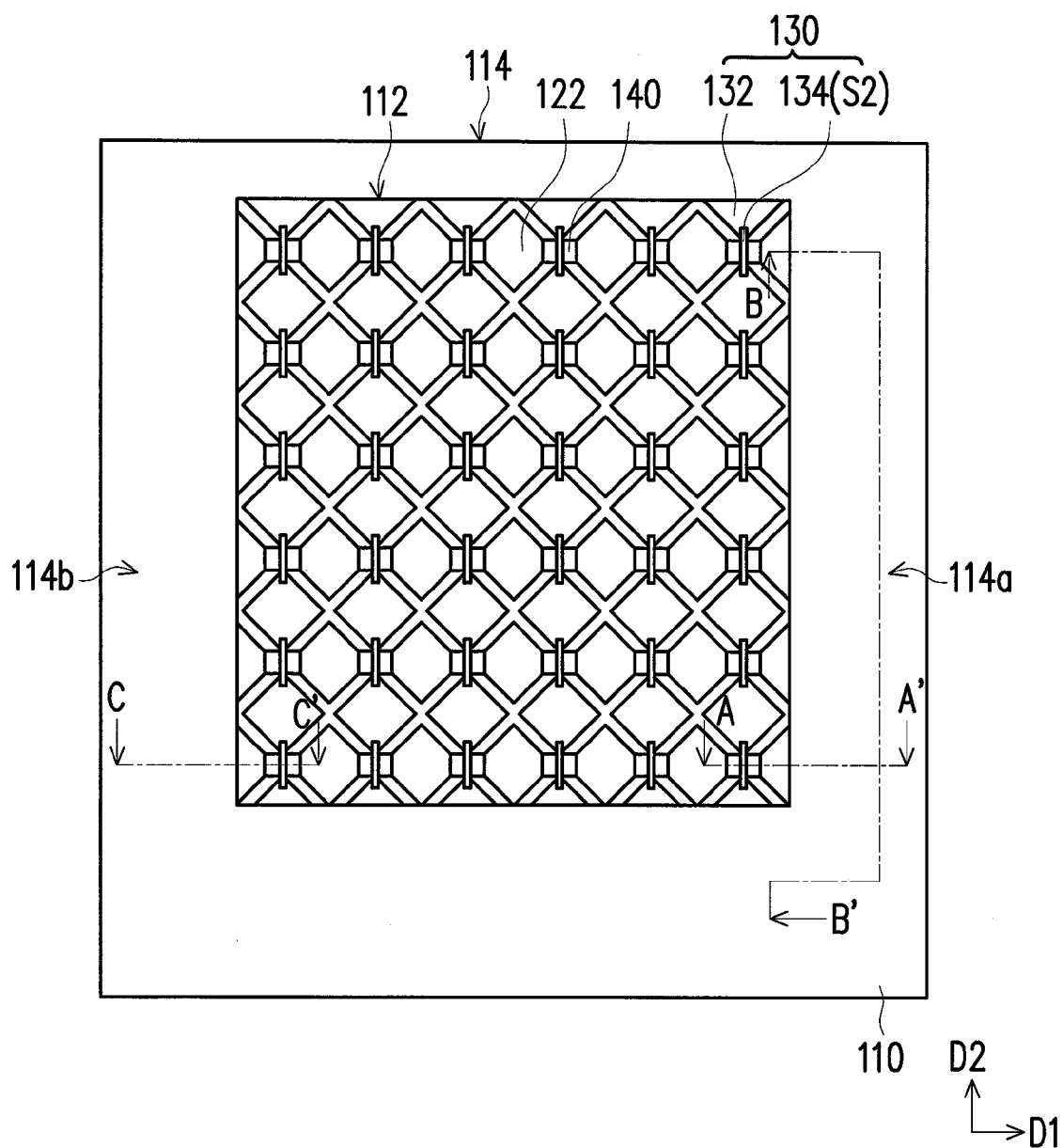

Referring to FIG. 2D and FIG. 3D, a second sensing conductive layer S2 is formed on the sensing region 112, and the second sensing conductive layer S2 includes at least one second bridging line 134. The second bridging line 134 covers, for example, one of the insulation patterns 140, and the second bridging line 134 further crosses over the insulation pattern 140 to electrically connect to two adjacent second sensing pads 132. The second sensing pads 132 and the second bridging lines 134 are serially connected to form at least one second sensing string 130. The second sensing string 130 is extended along a second direction D2, and the adjacent second sensing strings 130 are electrically insulated from one another. Since the insulation pattern 140 is disposed between the corresponding first bridging line 124 and the second bridging line 134, the first sensing string 120 and the second sensing string 130 are electrically insulated to each other. The first sensing string 120 and the second sensing string 130 are disposed in a crisscross manner. In other words, the first direction D1 and the second direction D2 are not parallel to each other. In an embodiment, the first direction D1 and the second direction D2 are perpendicular to each other.

A material of the second sensing conductive layer S2 is, for example, a conductive material containing metal, or other appropriate conductive materials. The conductive material containing metal is, for example, a conductive silver paste, a copper metal, or a stacked layer of Mo/Al—Mo. However, the disclosure is not limited thereto. In other embodiments, the material of the second sensing conductive layer S2 may be identical to the material of the first sensing conductive layer S1. A method of forming the second sensing conductive layer S2 includes, for example, a film deposition, a screen printing, a photolithography process, an ink jet printing, a transfer printing, or a roll to roll printing process.

Figure 2E:
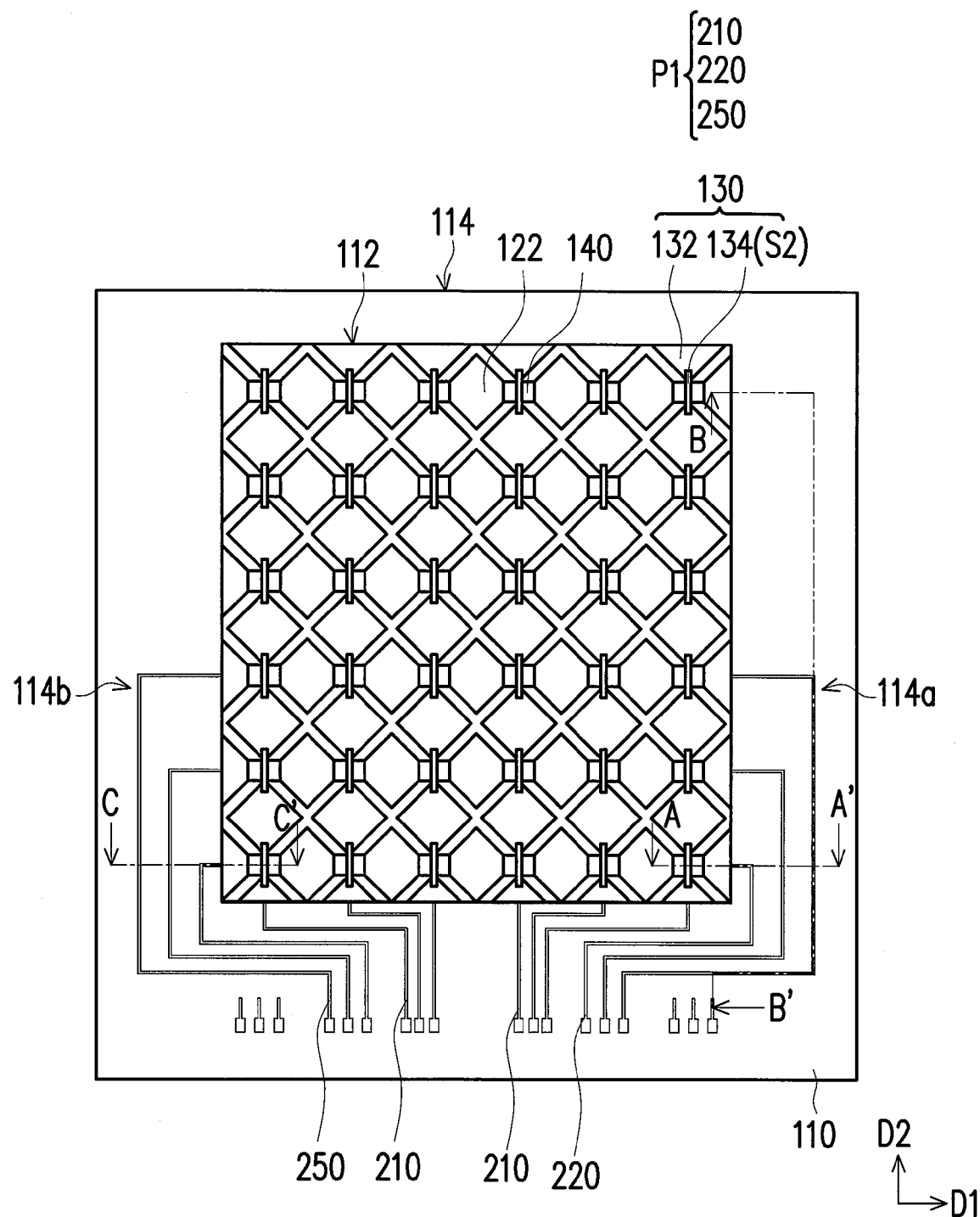

Referring to FIG. 2E and FIG. 3E, a first periphery conductive layer P1 is formed on the periphery region 114. The first periphery conductive layer P1 includes at least one sensing conductive line 210 and at least one first conductive line 220. The sensing conductive line 210 is electrically connected to one of the second sensing strings 130, and the sensing conductive line 210 is electrically connected to the circuit board 300.

In the present embodiment, the first periphery conductive layer P1 includes, for example, a plurality of first conductive lines 220 disposed on the first region 114a. Each of the first conductive lines 220 is electrically connected to the circuit board 300 and one of the first sensing strings 120. The first conductive line 220 may transmit a sensing signal of the corresponding first sensing string 120 to the circuit board 300.

A material of the first periphery conductive layer P1 is, for example, a conductive material containing metal, or other appropriate conductive materials. The conductive material containing metal is, for example, a conductive silver paste, a copper metal, or a stacked layer of Mo/Al—Mo. However, the disclosure is not limited thereto. In other embodiments, the material of the first periphery conductive layer P1 may be identical to the material of the first sensing conductive layer S1. A method of forming the first periphery conductive layer P1 includes, for example, a photolithography process, a screen printing, an ink-jet printing, a transfer printing, or a roll to roll printing process.

Figure 2F:
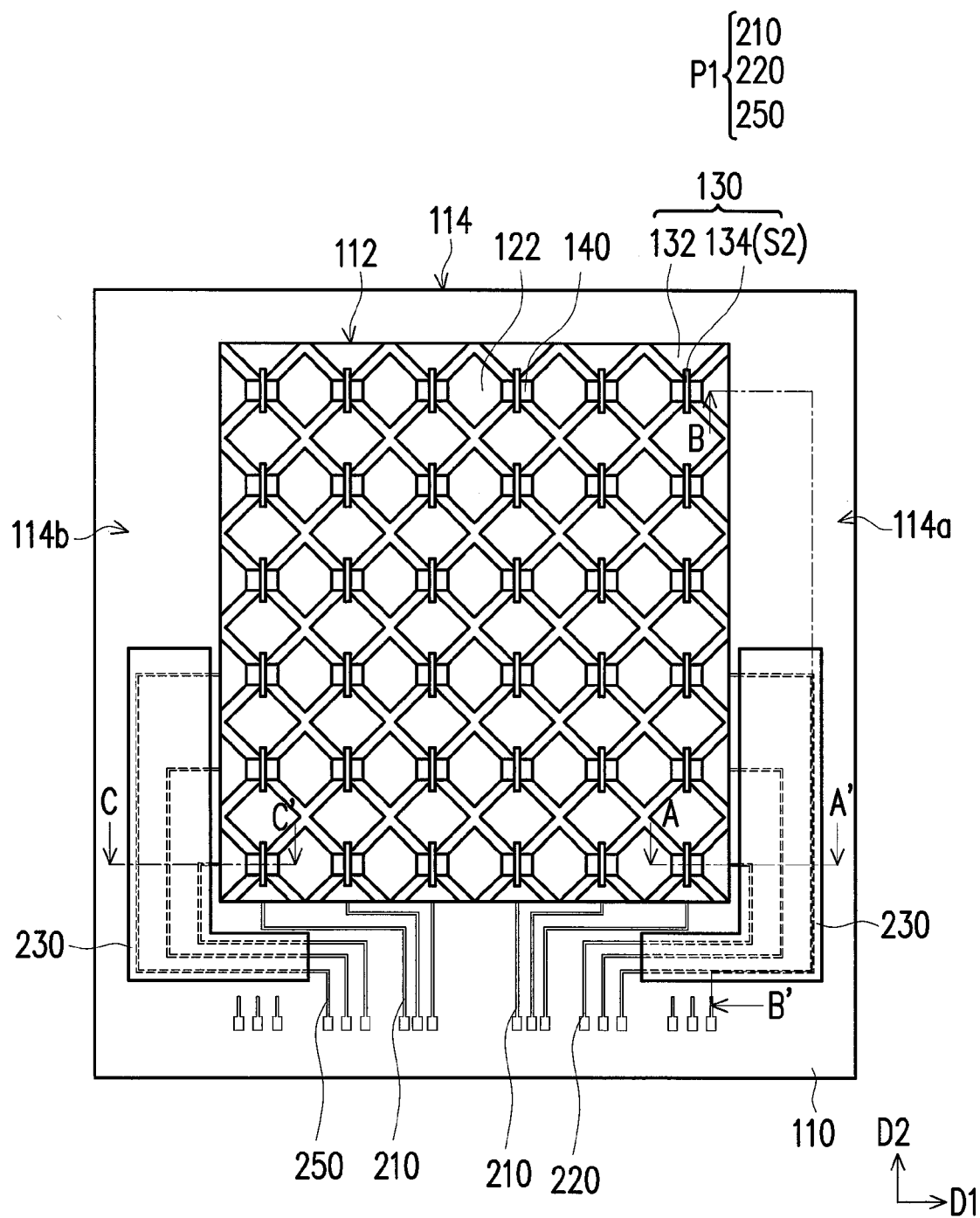

Referring to FIG. 2F and FIG. 3F, an insulating layer 230 is formed on the periphery region 114. The insulating layer 230 covers the first conductive lines 220. A material of the insulating layer 230 is, for example, a photosensitive resin or a thermoset resin.

Figure 2G:
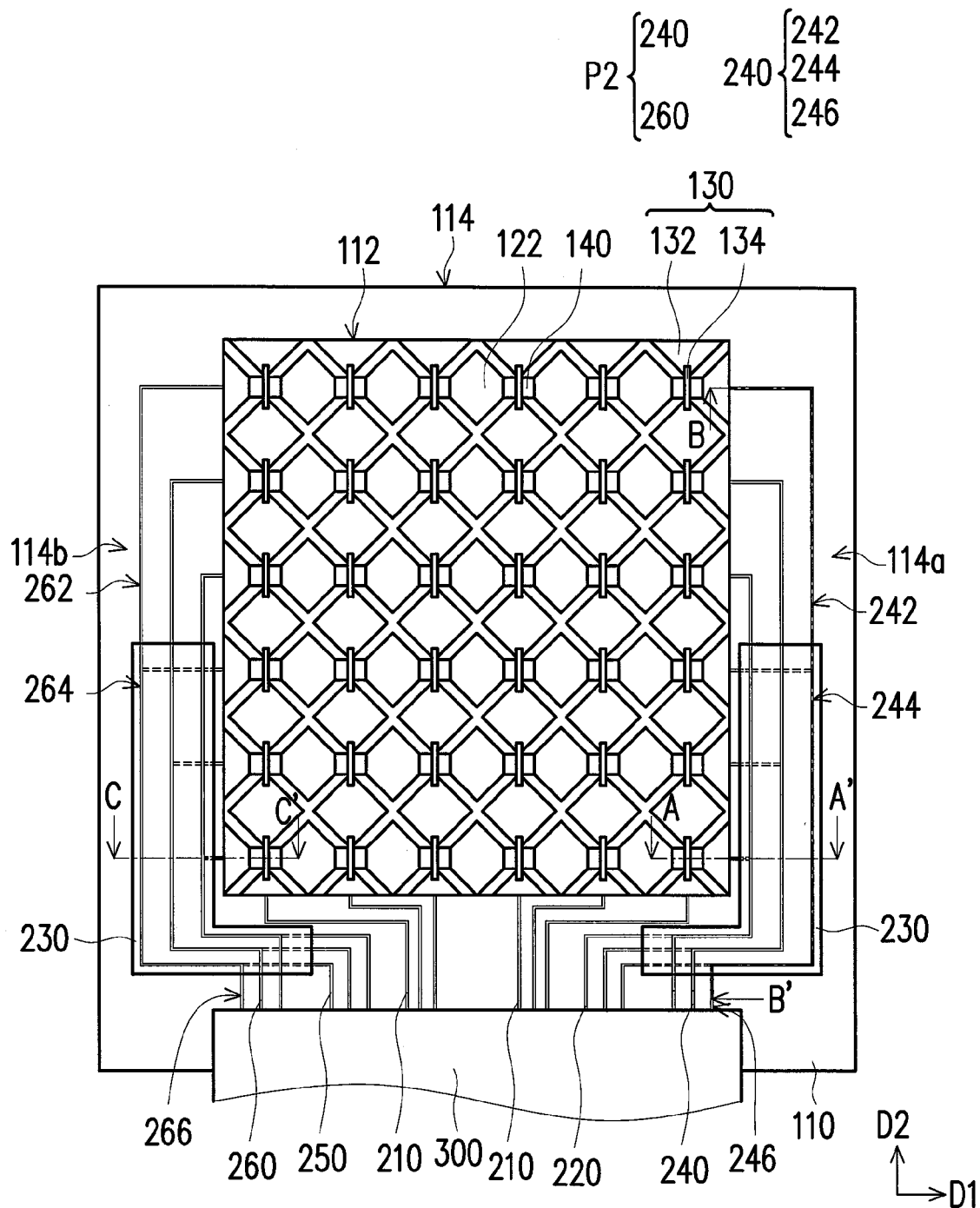
Figure 3G:
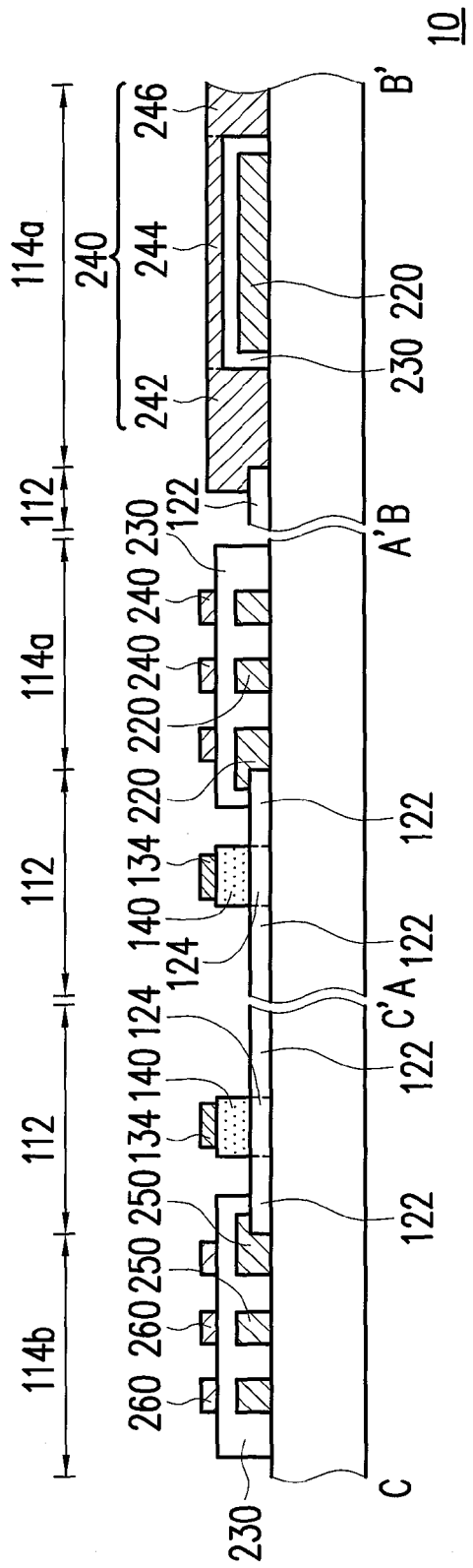

Referring to FIG. 2G and FIG. 3G, a second periphery conductive layer P2 is formed on the periphery region 114. The second periphery conductive layer P2 includes at least one second conductive line 240. The first conductive line 220 and the second conductive line 240 are electrically insulated to each other. In the present embodiment, the second periphery conductive layer P2 includes, for example, a plurality of second conductive lines 240 disposed on the first region 114a. A portion of at least one the second conductive line 240 is disposed on the insulating layer 230 located above the first conductive line 220. The second conductive lines 240 is electrically connected to the circuit board 300 and one of the first sensing strings 120. The second conductive line 240 may transmit a sensing signal of the corresponding first sensing string 120 to the circuit board 300. The second conductive line 240 and the first conductive line 220 are electrically connected to different first sensing strings 120.

The second conductive line 240 includes a first connection portion 242, a first transmission portion 244 and a first fan-in portion 246. The first connection portion 242 is disposed on the substrate 110 and connected to the first sensing pad 122. The first transmission portion 244 is disposed on the insulating layer 230, and the first transmission portion 244 is disposed to overlap with the first conductive line 220. The first transmission portion 244 and the first conductive line 220 are electrically insulated to each other by the insulating layer 230. The first fan-in portion 246 is disposed on the substrate 110 and connected to the circuit board 300. The first transmission portion 244 is connected between the first connection portion 242 and the first fan-in portion 246. In the present embodiment, the first fan-in portion 246 may be manufactured with the first connection portion 242 and the first transmission portion 244 at the same process step to include the same material. However, the disclosure is not limited thereto. In other embodiments, the first connection portion 242 and the first transmission portion 244 may be manufactured in advance. Thereafter, the first fan-in portion 246 may be manufactured by using a different material. For instance, the first connection portion 242 and the first transmission portion 244 may be manufactured by using the conductive silver through the screen printing. The first fan-in portion 246 may be manufactured by using the conductive metal such as copper through the photolithography process. Each of the first fan-in portions 246 between the second conductive lines 240 may include a relatively smaller line width and a relatively smaller line interval to accomplish a more preferable fan-in effect for the conductive lines, thereby connecting all periphery conductive lines into the circuit board 300.

In the present embodiment, the second conductive line 240 is divided into, for example, the first connection portion 242 electrically connected to the first sensing string 120, the first fan-in portion 246 electrically connected to the circuit board 300, and the first transmission portion 244 connected between the first connection portion 242 and the first fan-in portion 246. Therein, the first transmission portion 244 and the first connection portion 242 are disposed on different layers, and the first transmission portion 244 and the first fan-in portion 246 are also disposed on different layers. The first transmission portion 244 may refer to as a layer-crossing structure. With disposition of the insulating layer 230 and the layer-crossing structure, a stack structure may be formed by disposing a portion of the second conductive line 240 above the first conductive line 220. The stack structure of the periphery conductive lines may reduce a distributing area of the first conductive lines 220 and the second conductive lines 240 in the periphery region 114, so as to reduce an area of the periphery region 114 of the touch panel 10. When the touch panel 10 of the present embodiment is disposed on the touch display panel 1 of FIG. 1, the design requirements in slim bezel for the touch display panel 1 may be satisfied.

A material of the second periphery conductive layer P2 is, for example, a conductive material containing metal or other appropriate conductive materials. The conductive material containing metal is, for example, a conductive silver paste, a copper metal, or a stacked layer of Mo/Al—Mo. However, the disclosure is not limited thereto. In other embodiments, the material of the second periphery conductive layer P2 may also be identical to the material of the first sensing conductive layer S1. A method of forming the second periphery conductive layer P2 includes, for example, a photolithography process, a screen printing, an ink-jet printing, a transfer printing, or a roll to roll printing process. In addition, the sensing conductive lines 210 may be formed in the manufacturing process of the second periphery conductive layer P2. In other words, the sensing conductive lines 210 may be selectively formed in the manufacturing process of the first periphery conductive layer P1 or in the manufacturing process of the second periphery conductive layer P2, and the disclosure is not limited thereto.

In the present embodiment, the first transmission portion 244 and the first conductive line 220 are overlapped. However, the disclosure is not limited thereto. In other embodiments, the first transmission portion 244 and the first conductive line 220 may be partially overlapped or staggered to each other. In other words, it falls in the protection scope of the disclosure as long as the first transmission portion 244 of the second conductive line 240 is disposed above the first conductive line 220 to form the stack structure of the periphery conductive lines.

Further explanations are given below. In the present embodiment, the touch panel 10 includes two periphery conductive layers (e.g., the first periphery conductive layer P1 and the second periphery conductive layer P2), each of the periphery conductive layers includes a plurality of conductive lines (e.g., the plurality of first conductive lines 220 and the plurality of second conductive lines 240), and each of the first sensing strings 120 is electrically connected to the circuit board 300 one by one through said conductive lines. However, the disclosure is not limited thereto. In other embodiment, more than three periphery conductive layers may be disposed on the touch panel, and the insulating layer may be disposed between adjacent periphery conductive layers to electrically insulate the periphery conductive layers from one another. Moreover, each of the periphery conductive layers may include one or more conductive lines, so as to electrically connect each of the first sensing strings 120 to the circuit board 300. In other words, a number of the periphery conductive layers in the periphery region 114 and a number of conductive lines in each of the periphery conductive layers are not particularly limited in the disclosure.

Referring back to FIGS. 2E to 2G and FIGS. 3E to 3G, the first periphery conductive layer P1 further includes at least one third conductive line 250 disposed on the second region 114b. The third conductive line 250 is electrically connected to the circuit board 300 and one of the first sensing strings 120, and the third conductive line 250 and the corresponding first conductive line 220 are electrically connected to the same first sensing string 120. The insulating layer 230 covers the third conductive lines 250. Further, the second periphery conductive layer P2 further includes at least one fourth conductive line 260 disposed on the second region 114b. The fourth conductive lines 260 is electrically connected to the circuit board 300 and one of the first sensing strings 120, and the fourth conductive line 260 and the corresponding second conductive line 240 are electrically connected to the same first sensing string 120.

In the present embodiment, the fourth conductive lines 260 and the second conductive lines 240 are formed at the same process step, and a structure of the fourth conductive line 260 is similarly to a structure of the second conductive line 240. Therefore, the fourth conductive line 260 may be divided into the second connection portion 262 electrically connected to the first sensing string 120, the second fan-in portion 266 electrically connected to the circuit board 300, and the second transmission portion 264 connected between the second connection portion 262 and the second fan-in portion 266. Therein, the second transmission portion 264 and the second connection portion 262 are disposed on different layers, and the second transmission portion 264 and the second fan-in portion 266 are disposed on different layers. The third conductive lines 250, the insulating layer 230, and the fourth conductive lines 260 form a stack structure of the periphery conductive lines in the second region 114b.

The third conductive line 250 and the corresponding first conductive line 220 are connected to the same first sensing string 120, and the fourth conductive line 260 and the corresponding second conductive line 240 are connected to the same first sensing string 120 thereby forming a structure of bilateral outlet. In the present embodiment, a resistance or a capacitance of the touch panel 10 may be detected through the third conductive line 250 and the fourth conductive line 260, so as to ensure a yield rate in the manufacturing process of the touch panel 10.

In the foregoing embodiments, the manufacturing process of the periphery region 114 is performed after the manufacturing process of the sensing region 112 is completed. However, the disclosure is not limited thereto. In the following embodiments, the manufacturing processes of the sensing region 112 and the periphery region 114 may be performed at the same process step so as to simplify manufacturing steps. It should be noted that, reference numerals in the foregoing embodiments are used in the following embodiments to indicate identical or similar components, and repeated description of the same technical contents is omitted.

Figure 4A:
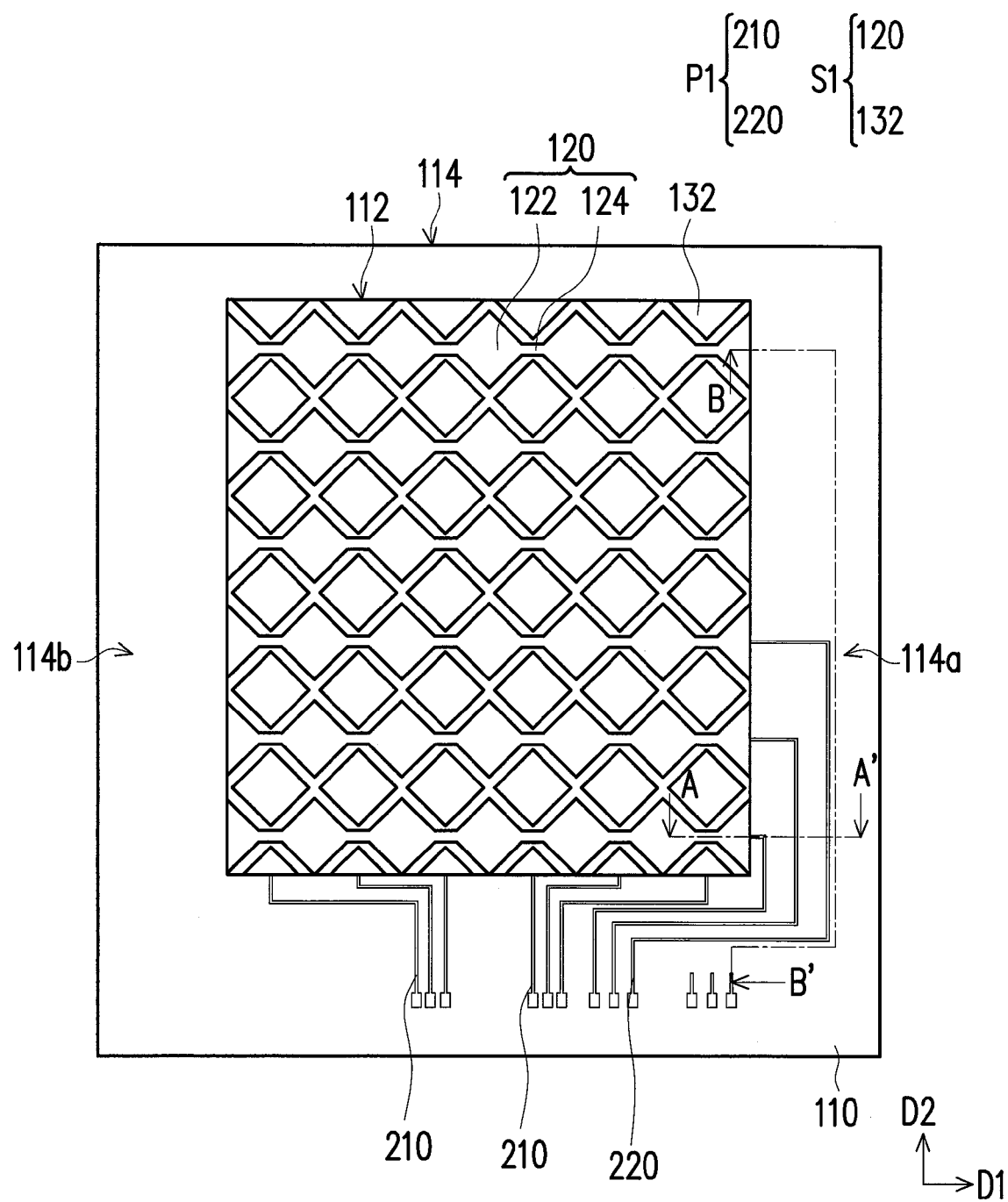
FIG. 4A to FIG. 4C are schematic top views of a manufacturing process of a touch panel according to another embodiment of the disclosure.
Figure 4B:
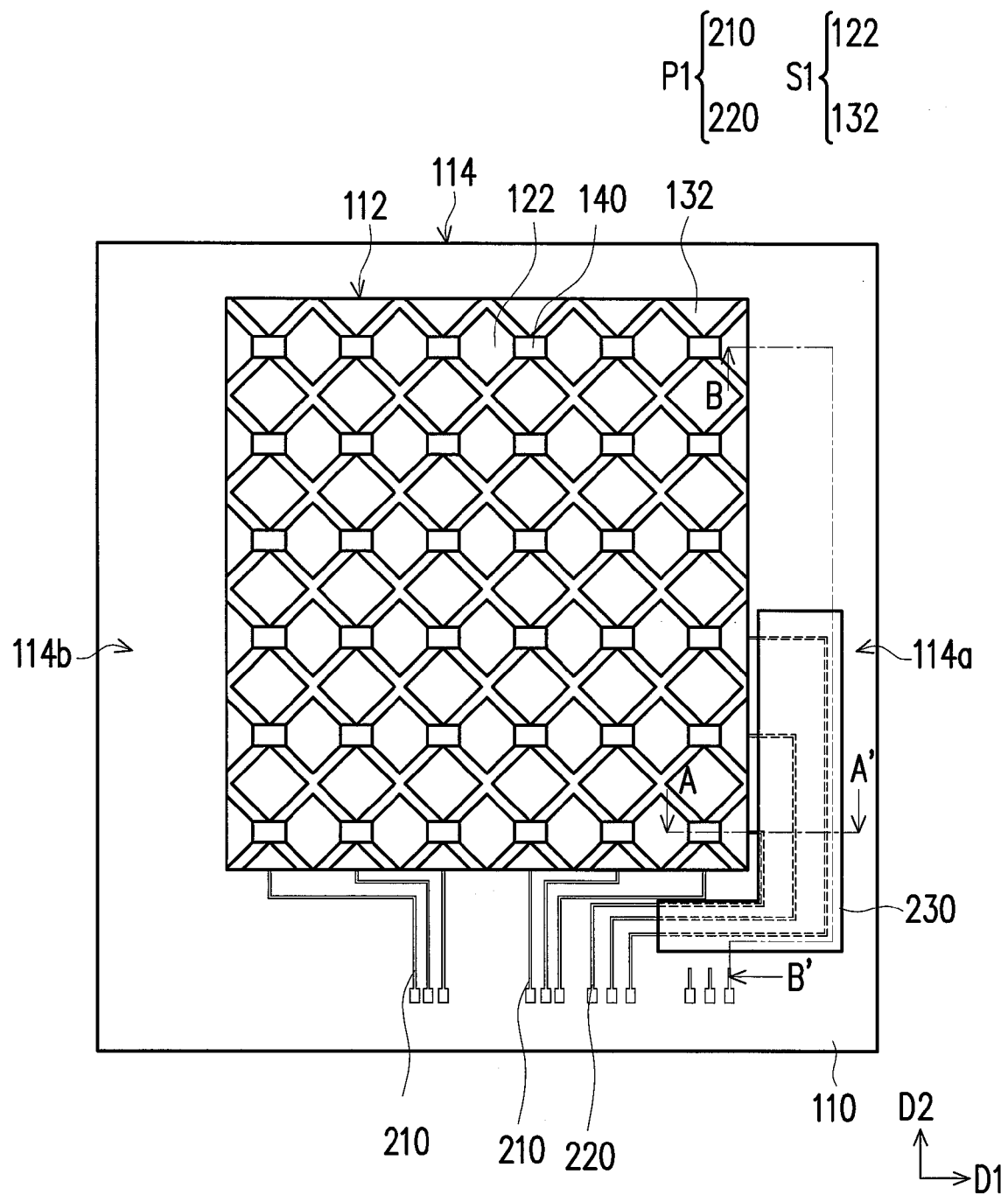
Figure 4C:
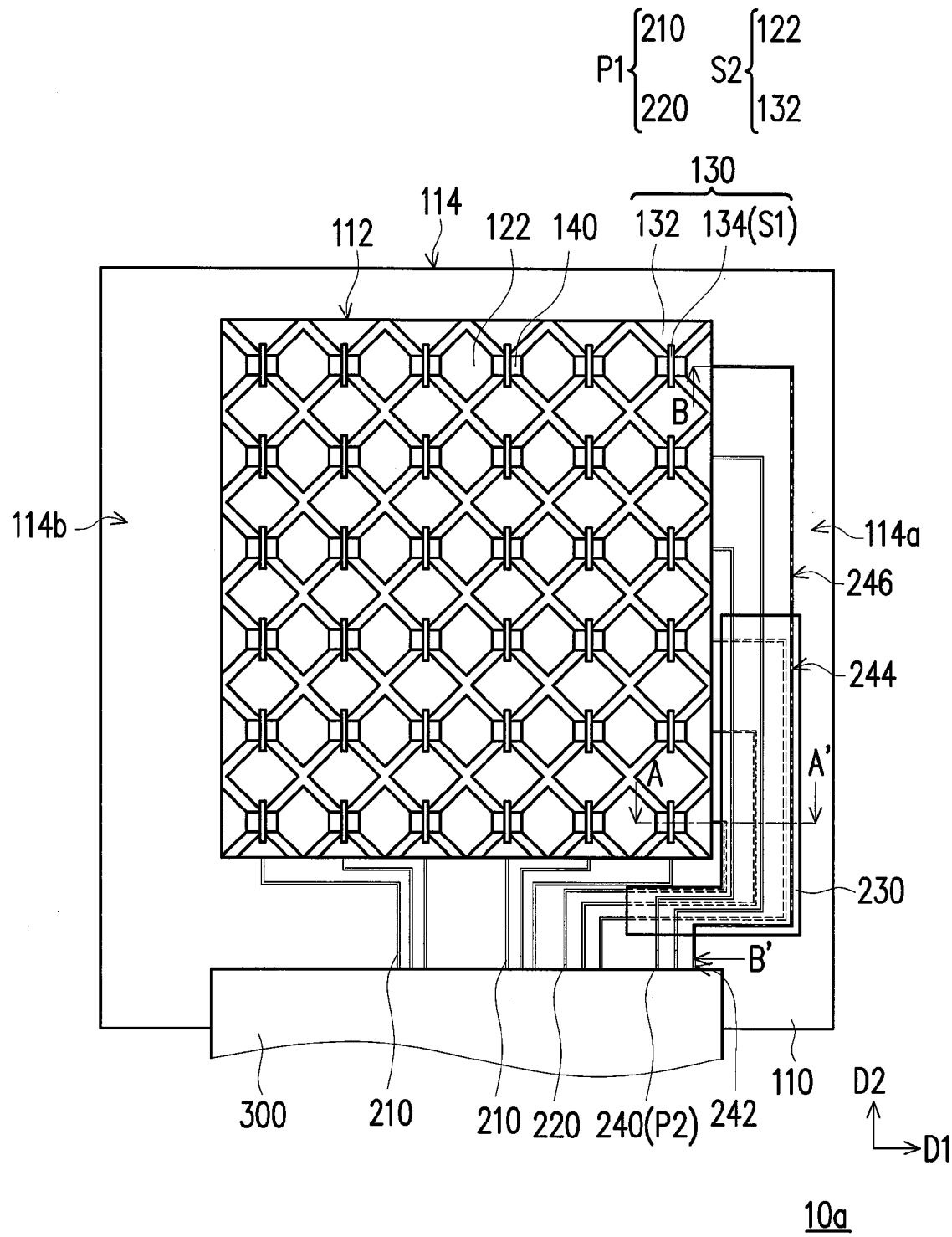
Figure 5A:
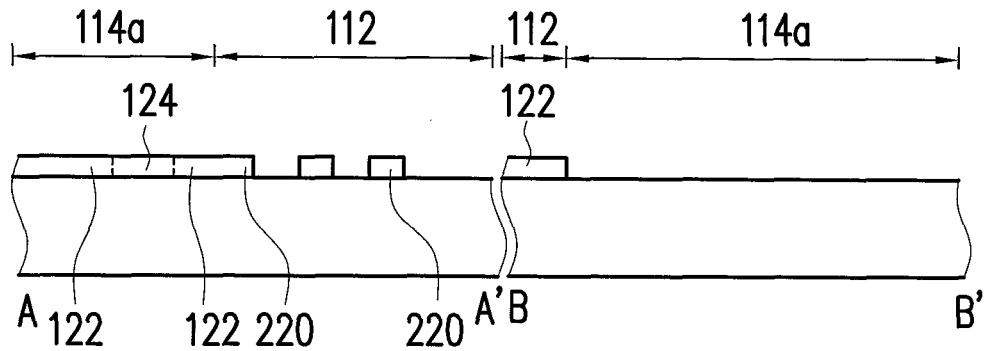
FIG. 5A to FIG. 5C are schematic cross-sectional views along lines A-A' and B-B' depicted in FIG. 4A to FIG. 4C, respectively.
Figure 5B:
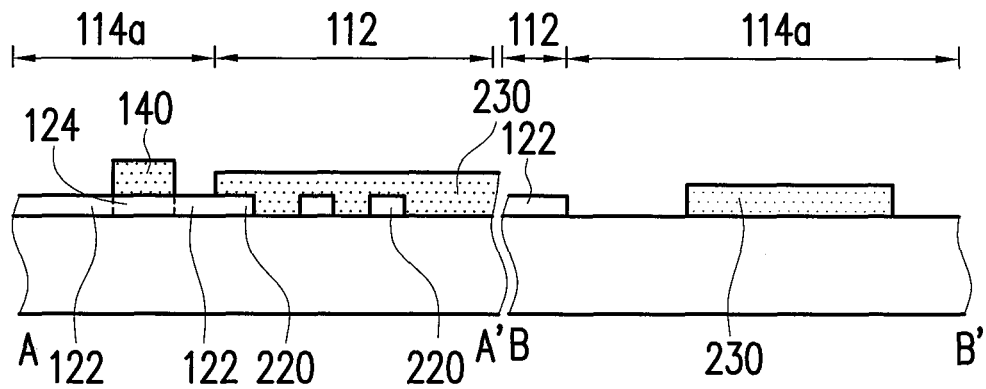
Figure 5C:
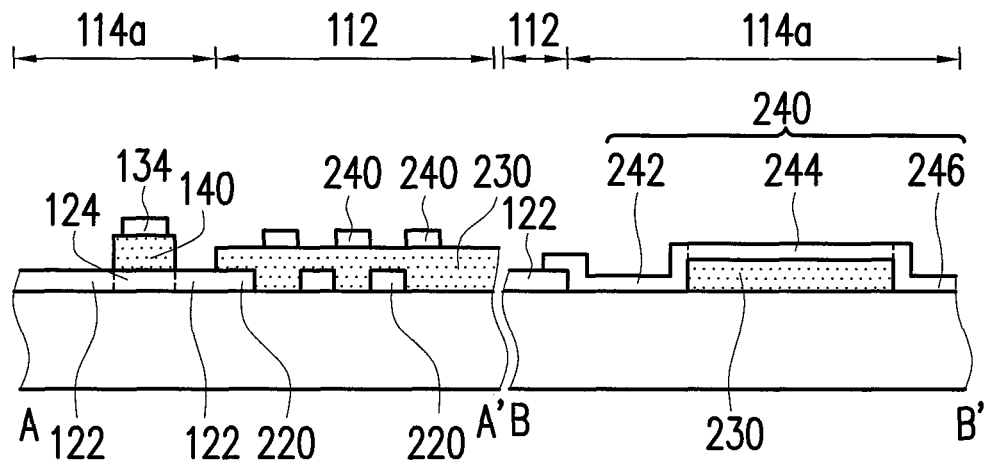

FIG. 4A to FIG. 4C are schematic top views of a manufacturing process of a touch panel according to another embodiment of the disclosure. FIG. 5A to FIG. 5C are schematic cross-sectional views along lines A-A' and B-B' depicted in FIG. 4A to FIG. 4C, respectively. Referring to FIG. 4A and FIG. 5A, the first sensing conductive layer S1 is formed on the sensing region 112 and the first periphery conductive layer P1 is formed on the periphery region 114 at the same process step. The first sensing conductive layer S1 includes at least one first sensing string 120 and a plurality of second sensing pads 132, and the first periphery conductive layer P1 includes at least one first conductive line 220. The first sensing string 120, the second sensing pad 132, and the first conductive line 220 are disposed on an identical layer.

In the present embodiment, a material of the first sensing conductive layer S1 is identical to that of the first periphery conductive layer P1, such as a transparent conductive material, conductive metal oxide, an organic conductive material, a nano-metal, a graphene, or a carbon nanotube. A method of forming the first sensing conductive layer S1 and the first periphery conductive layer P1 is, for example, a film deposition, a screen printing, a photolithography process, an ink jet printing, a transfer printing, or a roll to roll printing process.

Referring to FIG. 4B and FIG. 5B, a plurality of insulation patterns 140 are formed on the sensing region 112 and an insulating layer 230 is formed on the periphery region 114 at the same process step. The insulation patterns 140 and the insulating layer 230 are disposed on an identical layer. The insulation patterns 140 cover a portion of the first sensing conductive layer S1, and the insulating layer 230 covers the first periphery conductive layer P1. A material of the insulation patterns 140 is identical to that of the insulating layer 230, such as a photosensitive resin or a thermoset resin.

Referring to FIG. 4C and FIG. 5C, the second sensing conductive layer S2 is formed on the sensing region 112 and the second periphery conductive layer P2 is formed on the periphery region 114 at the same process step. The second sensing conductive layer S2 includes at least one second bridging line 134, and the second periphery conductive layer P2 includes at least one second conductive line 240. The second bridging line 134 and the second conductive line 240 are disposed on an identical layer. In the present embodiment, the first transmission portion 244 of the second conductive line 240 is, for example, disposed in a crisscross manner with the first conductive line 220. Such disposition may facilitate in reducing a parasitic capacitance between the first conductive line 220 and the first transmission portion 244 in a touch panel 10a. The touch panel 10 depicted in FIG. 1 may be selectively replaced by the touch panel 10a or a touch panel 10b which will be discussed later, so that the design requirements in slim bezel for the touch display panel 1 may be satisfied.

In the present embodiment, a material of the second sensing conductive layer S2 is identical to that of the second periphery conductive layer P2, such as a transparent conductive material, conductive metal oxide, an organic conductive material, a nano-metal, a graphene, or a carbon nanotube. A method of forming the second sensing conductive layer S2 and the second periphery conductive layer P2 is, for example, a film deposition, a screen printing, a photolithography process, an ink-jet printing, a transfer printing, or a roll to roll printing process.

Figure 6:
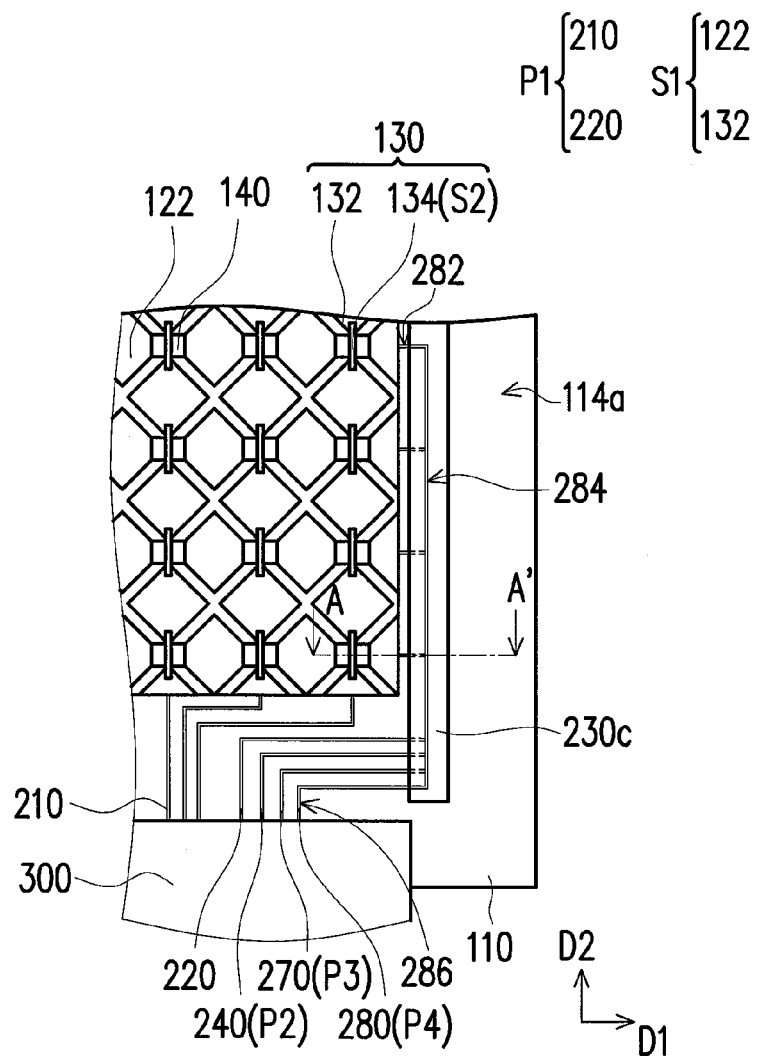
FIG. 6 is a partial schematic top view of a touch panel according to another embodiment of the disclosure.
Figure 7:
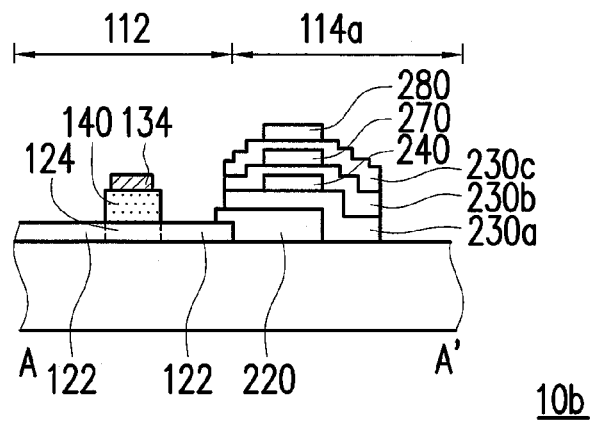
FIG. 7 is a schematic cross-sectional view along line A-A' depicted in FIG. 6.

FIG. 6 is a partial schematic top view of a touch panel according to another embodiment of the disclosure. FIG. 7 is a schematic cross-sectional view along line A-A' depicted in FIG. 6. The touch panel 10b is similar to the touch panel 10 of FIG. 2G, a difference between the two is that, in the present embodiment, the first periphery conductive layer P1 includes one first conductive line 220, and the second periphery conductive layer P2 includes one second conductive line 240. The touch panel 10b further includes a third periphery conductive layer P3 and a fourth periphery conductive layer P4. The third periphery conductive layer P3 includes one fifth conductive line 270, and the fourth periphery conductive layer P4 includes one sixth conductive line 280. An insulating layer 230a is provided between the first conductive line 220 and the second conductive line 240, an insulating layer 230b is provided between the second conductive line 240 and the fifth conductive line 270, and an insulating layer 230c is provided between the fifth conductive line 270 and the sixth conductive line 280. In the present embodiment, structures of the fifth conductive line 270 and the sixth conductive line 280 are similar to the structure of the second conductive line 240. Take the sixth conductive line 280 as an example, the sixth conductive line 280 may also be divided into a connection portion 282, a transmission portion 284, and a fan-in portion 286.

The touch panel 10b includes, for example, a plurality of periphery conductive layers and a plurality of insulating layers to form a stack structure of the periphery conductive lines. For instance, one conductive line is disposed on each of the periphery conductive layers, thus the distributing area of the conductive lines in the periphery region 114 may be further reduced. When the touch panel 10b of the present embodiment is disposed on the touch display panel 1 of FIG. 1, the design requirements in slim bezel for the touch display panel 1 may be satisfied.

Figure 8A:
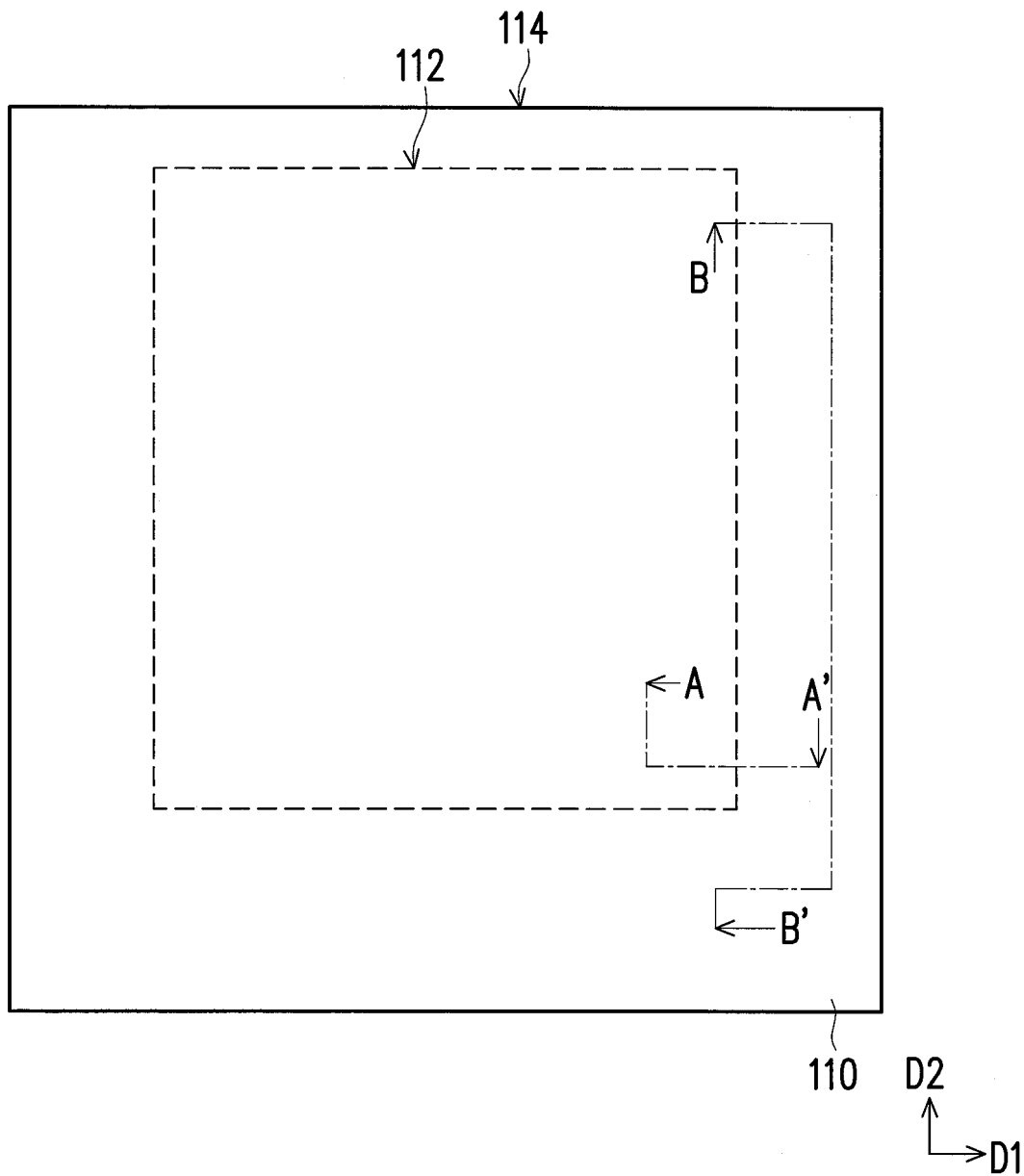
FIG. 8A to FIG. 8E are schematic top views of a manufacturing process of a touch panel according to an embodiment of the disclosure.

FIG. 8A to FIG. 8E are schematic top views of a manufacturing process of a touch panel according to an embodiment of the disclosure. FIG. 9A to FIG. 9D are schematic cross-sectional views along lines A-A' and B-B' depicted in FIG. 8A to FIG. 8D, respectively. Referring to FIG. 8A and FIG. 9A, first, a substrate 110 is provided. The substrate 110 includes a sensing region 112 and a periphery region 114, and the periphery region 114 is disposed to surround the sensing region 112. The sensing region 112 is used to dispose a sensing device layer, such as a display region corresponding to a display device. The periphery region 114 is used to dispose periphery circuits, such as a non-display region corresponding to the display device. A material of the substrate 110 is, for example, a glass or a plastic. The circuits in the periphery region 114 may be electrically connected to an electronic device (not illustrated) in subsequent processes.

Figure 8B:
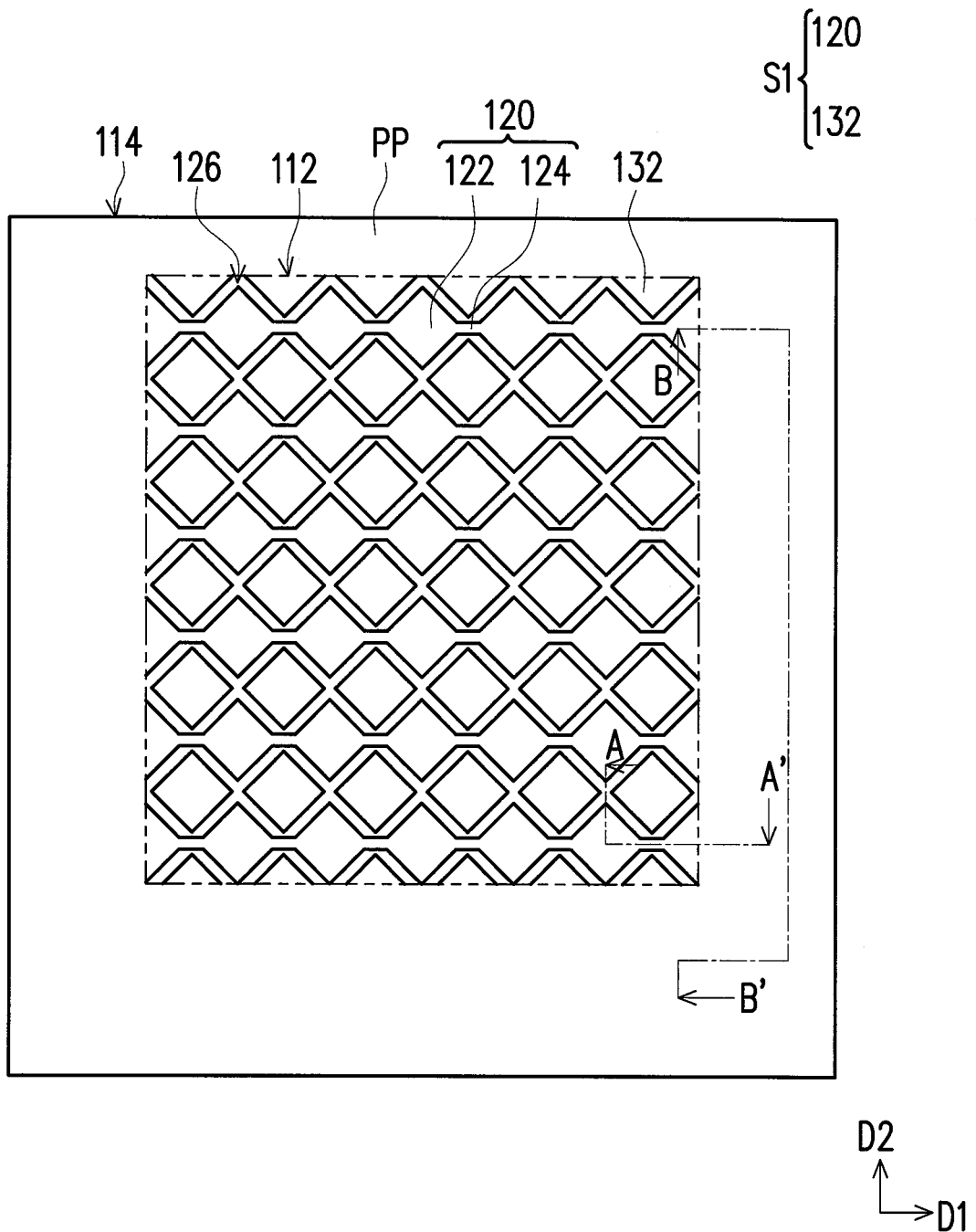
Figure 9A:
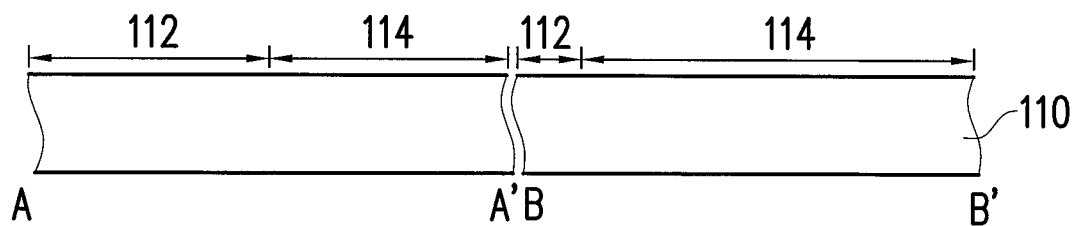
FIG. 9A to FIG. 9D are schematic cross-sectional views along lines A-A' and B-B' depicted in FIG. 8A to FIG. 8D, respectively.
Figure 9B:
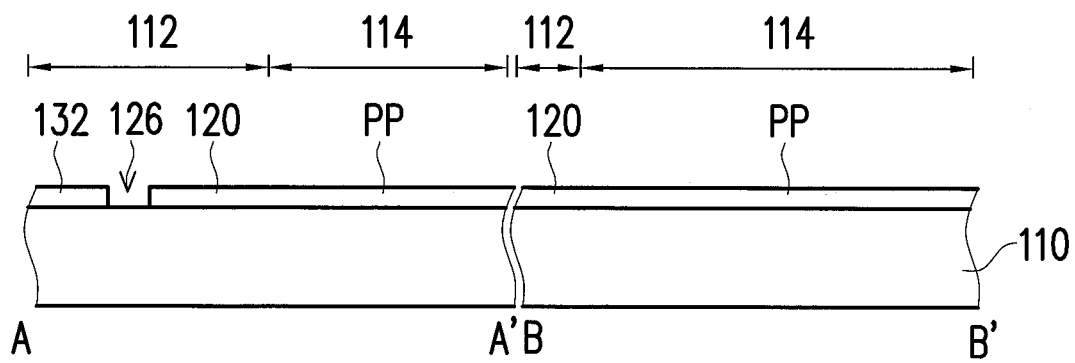

Referring to FIG. 8B and FIG. 9B, a first sensing conductive layer S1 is formed on the sensing region 112. The first sensing conductive layer S1 includes at least one first sensing string 120 and a plurality of second sensing pads 132 are formed in the sensing region 112 and a periphery pattern PP is formed in the periphery region 114. The first sensing string 120, the second sensing pads 132 and the periphery pattern PP are formed by forming a material (not shown) on the substrate 110 and then patterning the material layer to form a plurality of trenches 126 so as to define the first sensing string 120 and the second sensing pad 132. The material layer comprises, for example, a transparent conductive material, conductive metal oxide, an organic conductive material, a nano-metal, a graphene, or a carbon nanotube. A method of forming the material layer includes, for example, a film deposition. In addition, the trenches 126 are formed with, for example, a laser ablation process. The first sensing string 120 includes a plurality of first sensing pads 122 and at least one first bridging line 124. The first bridging line 124 is electrically connected to two adjacent first sensing pads 122 to form one of the first sensing strings 120. The first sensing string 120 is extended along a first direction D1, and the adjacent first sensing strings 120 are electrically insulated from one another. The second sensing pads 132 are arranged along a second direction D2.

Figure 8C:
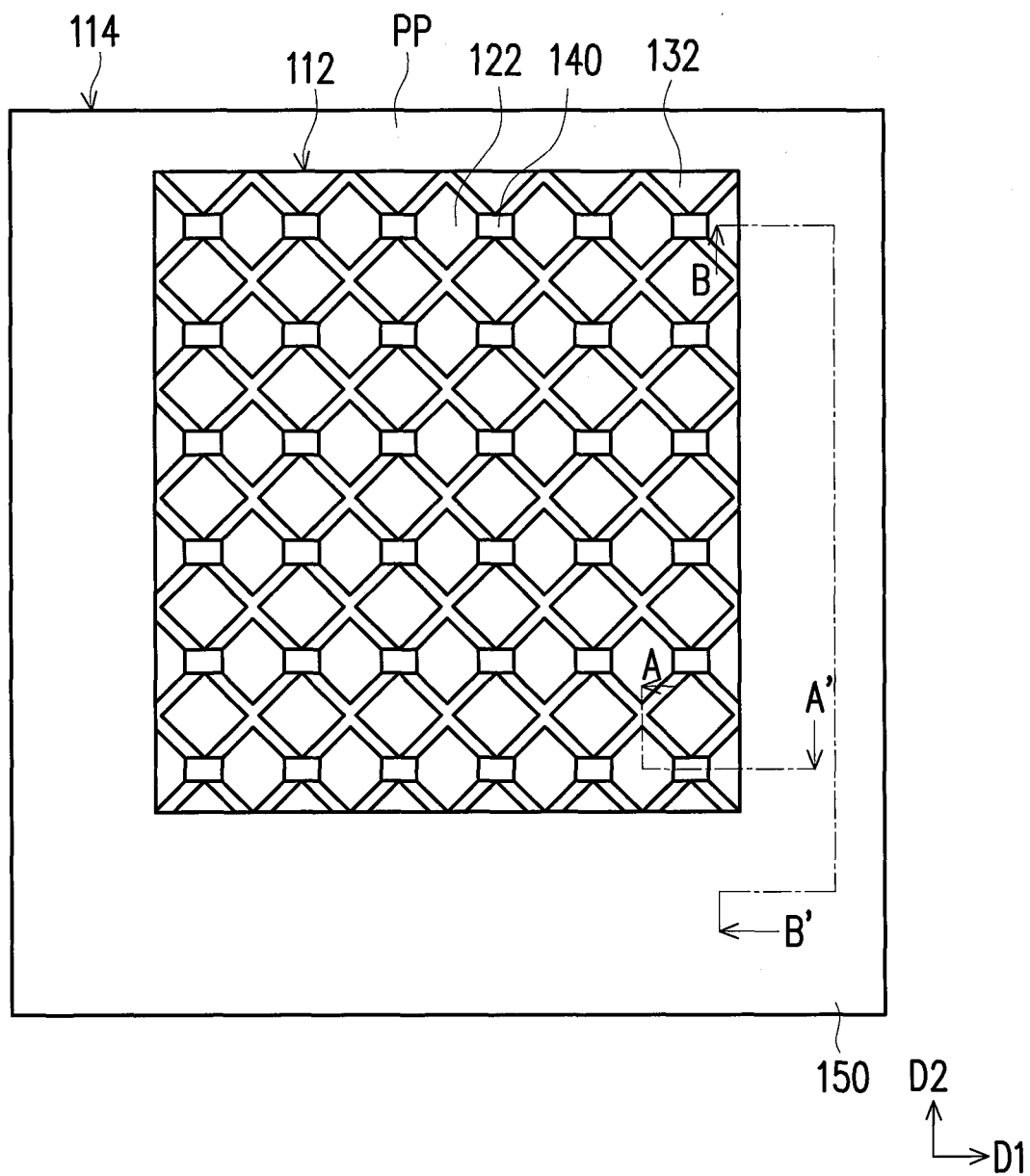
Figure 9C:
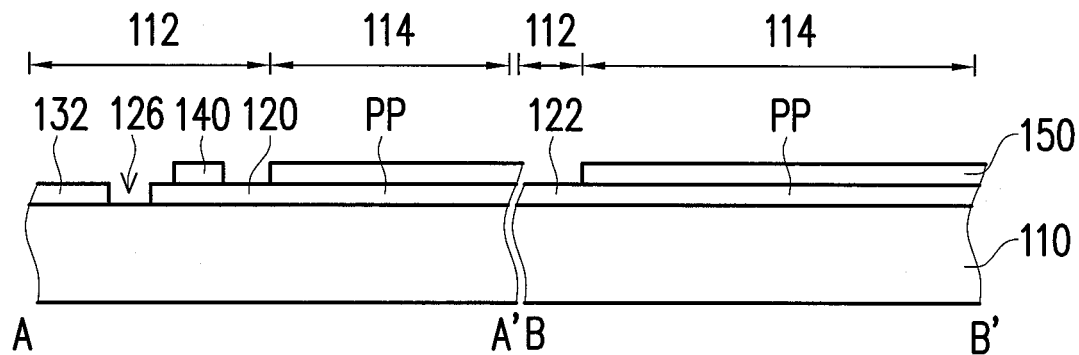

Referring to FIG. 8C and FIG. 9C, a plurality of insulation patterns 140 are formed in the sensing region 112. At the same time, a first insulating layer 150 is formed on the periphery pattern PP located in the periphery region 114. In other words, the insulation patterns 140 and the first insulating layer 150 are disposed on an identical layer. The insulation patterns 140 covers the first bridging lines 124. A material of the insulation patterns 140 and the first insulating layer 150 is, for example, a photosensitive resin or a thermoset resin. The material of the insulation patterns 140 and the material of the first insulating layer 150 can be the same. However, in other embodiments, the materials can be different. By forming the first insulating layer 150 on the periphery pattern PP, the requirement of using laser to remove the periphery pattern PP can be waived, and the manufacturing time can be reduced.

Figure 8D:
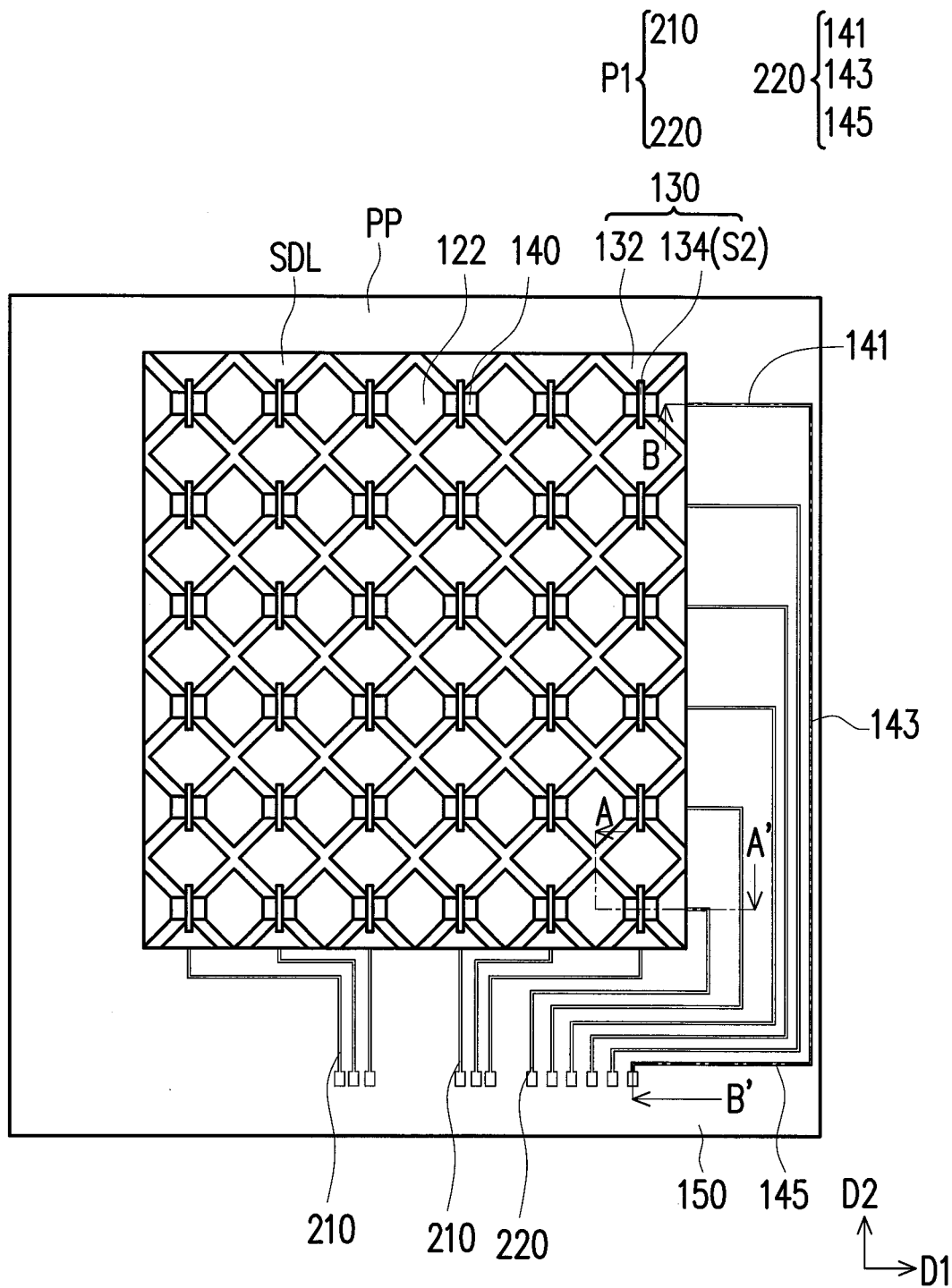
Figure 8E:
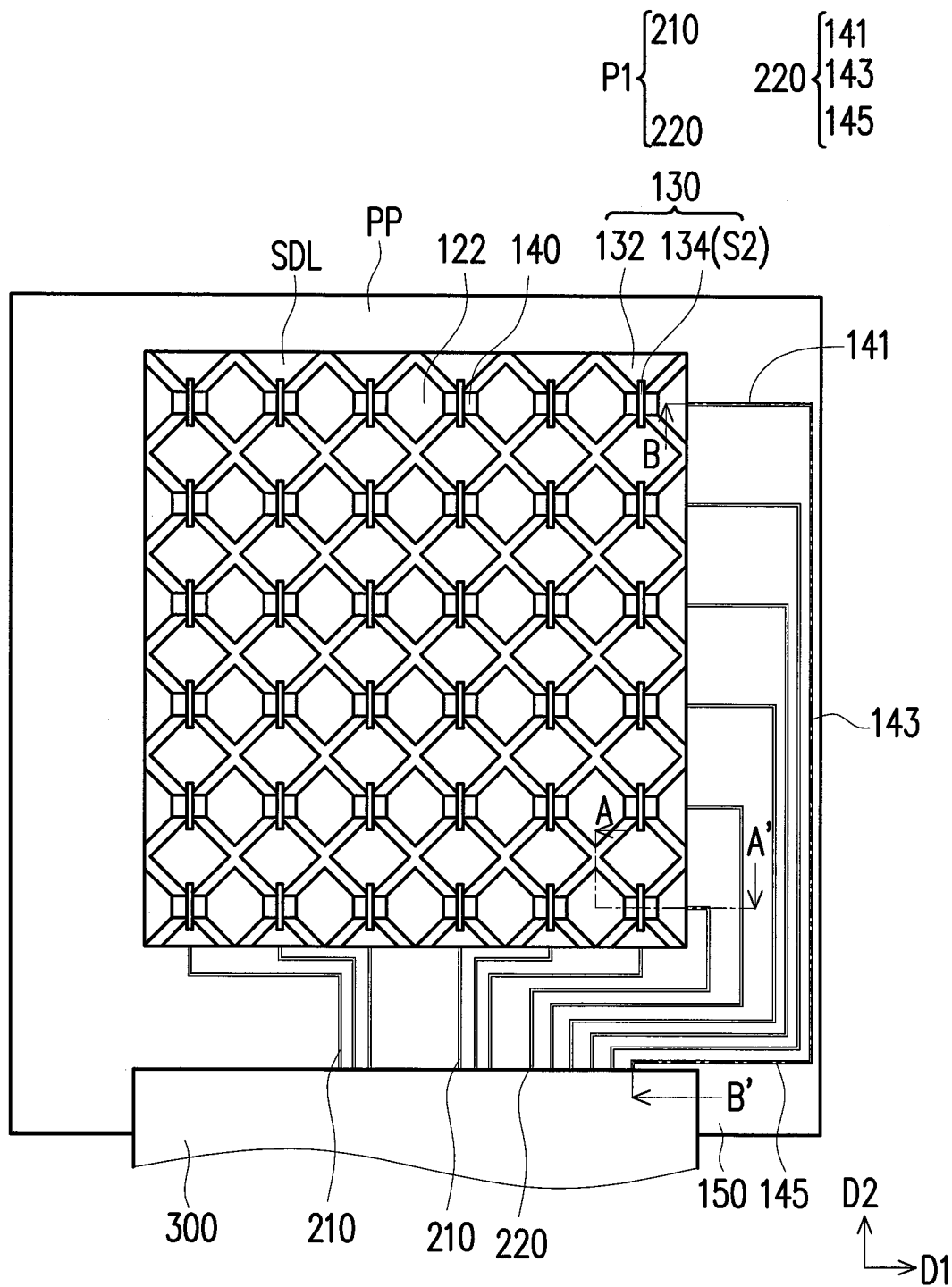
Figure 9D:
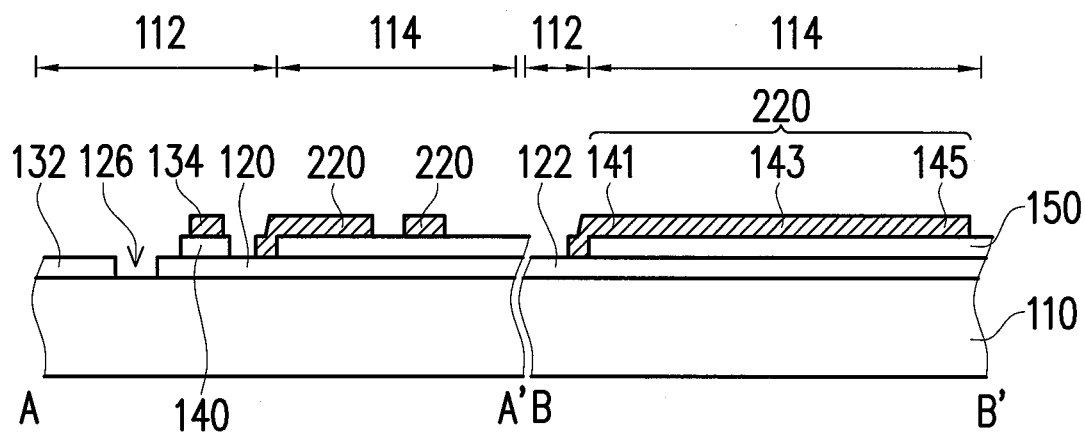

Referring to FIG. 8D and FIG. 9D, a second sensing conductive layer S2 is formed on the sensing region 112 to complete the formation of a sensing device layer SDL. The sensing device layer SDL is located in the sensing region 112. The second sensing conductive layer S2 includes at least one second bridging line 134. The second bridging line 134 covers, for example, one of the insulation patterns 140, and the second bridging line 134 further crosses over the insulation pattern 140 to electrically connect to two adjacent second sensing pads 132. The second sensing pads 132 and the second bridging lines 134 are serially connected to form at least one second sensing string 130. The second sensing string 130 is extended along a second direction D2, and the adjacent second sensing strings 130 are electrically insulated from one another. Since the insulation pattern 140 is disposed between the corresponding first bridging line 134 and the second bridging line 134, the first sensing string 120 and the second sensing string 130 are electrically insulated to each other. The first sensing string 120 and the second sensing string 130 are disposed in a crisscross manner. In other words, the first direction D1 and the second direction D2 are not parallel to each other. In an embodiment, the first direction D1 and the second direction D2 are perpendicular to each other.

A material of the second sensing conductive layer S2 is, for example, a conductive material containing metal, or other appropriate conductive materials. The conductive material containing metal is, for example, a conductive silver paste, a copper metal, or a stacked layer of Mo/Al— Mo. However, the disclosure is not limited thereto. In other embodiments, the material of the second sensing conductive layer S2 may also be identical to the material of the first sensing conductive layer S1. A method of forming the second sensing conductive layer S2 includes, for example, a film deposition, a screen printing, a photolithography process, an ink jet printing, a transfer printing, or a roll to roll printing process.

In the present embodiment, when the second sensing conductive layer S2 is formed in the sensing region 112, a first periphery conductive layer P1 is formed on the periphery pattern PP located in the periphery region 114 simultaneously. The first periphery conductive layer P1 includes at least one sensing conductive line 210 and at least one first conductive line 220. In other words, the second bridging line 134 and the first conductive line 220 are disposed on an identical layer. The sensing conductive line 210 is electrically connected to one of the second sensing strings 130. The first conductive line 220 is electrically connected to one of the first sensing strings 120. The sensing conductive line 210 and the first conductive line 220 may be electrically connected to an electronic device, such as a circuit board 300 shown in FIG. 8E, in subsequent processes. The first conductive line 220 may transmit a sensing signal of the corresponding first sensing string 120 to the electronic device.

Referring to FIG. 8D and FIG. 9D, the first conductive line 220 includes a third connection portion 141, a third transmission portion 143, and a third fan-in portion 145. The third connection portion 141 is disposed on the first insulating layer 150 and electrically connected to one of the first sensing strings 120. The third transmission portion 143 and the third fan-in portion 145 are disposed on the first insulating layer 150 as well. The third transmission portion 143 is connected between the third connection portion 141 and the third fan-in portion 145. The third fan-in portion 145 may be electrically connected to the electronic device, such as a circuit board 300 shown in FIG. 8E, in subsequent processes. In the present embodiment, the third fan-in portion 145 may be manufactured with the third connection portion 141 and the third transmission portion 143 at the same process step to include the same material. However, the disclosure is not limited thereto. In other embodiments, the third connection portion 141 and the third transmission portion 143 may be manufactured in advance. Thereafter, the third fan-in portion 145 may be manufactured to by using a different material. For instance, the third connection portion 141 and the third transmission portion 143 may be manufactured by using the conductive silver through the screen printing. The third fan-in portion 145 may be manufactured by using the conductive metal such as copper through the photolithography process. It should be note that at the border of the periphery pattern PP and the sensing device layer SDL, the first conductive lines 220 bridge over to the layer where the first sensing strings 120 are located. In other words, the third connection portion 141 of the first conductive line 220 travels down to another layer at the border in order to be electrically connected to the sensing device layer SDL.

A material of the first periphery conductive layer P1 is, for example, a conductive material containing metal, or other appropriate conductive materials. The conductive material containing metal is, for example, a conductive silver paste, a copper metal, or a stacked layer of Mo/Al—Mo. However, the disclosure is not limited thereto. In other embodiments, the material of the first periphery conductive layer P1 may be identical to the material of the first sensing conductive layer S1 or the material of the second sensing conductive layer S2. A method of forming the first periphery conductive layer P1 includes, for example, a photolithography process, a screen printing, an ink-jet printing, a transfer printing, or a roll to roll printing process.

In the foregoing embodiments, equal amount of the first conductive lines 220 and the first sensing strings 120 are provided. In other words, each of the first sensing strings 120 has a corresponding first conductive line 220 to connect to. However, the disclosure is not limited thereto. In the following embodiments, the amount of first sensing strings 120 may be greater than the amount of the first conductive lines 220. In other words, not each of the first sensing strings 120 has a corresponding first conductive line 220. It should be noted that, reference numerals in the foregoing embodiments are used in the following embodiments to indicate identical or similar components, and repeated description of the same technical contents is omitted.

Figure 10A:
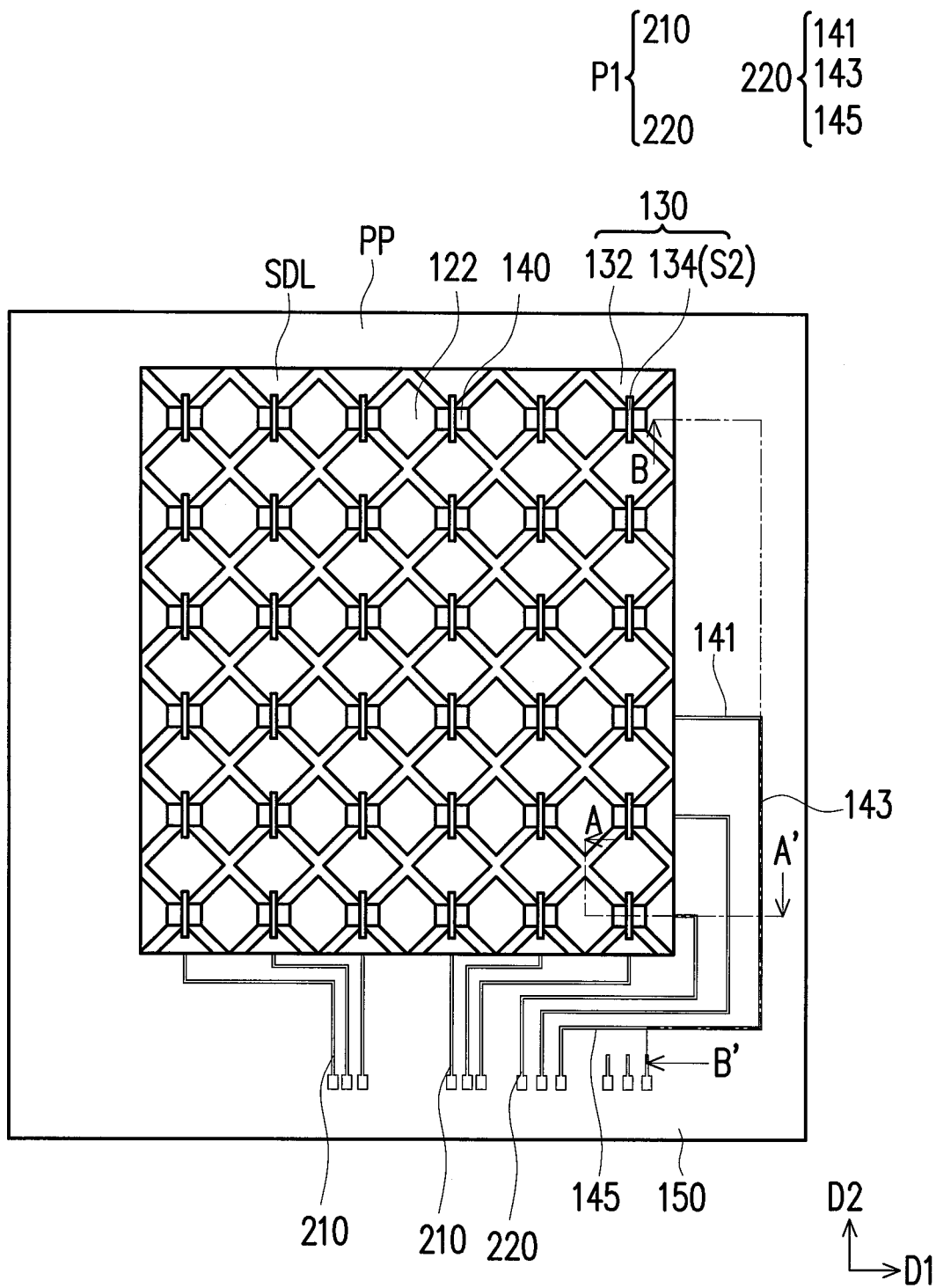
FIG. 10A to FIG. 10D are schematic top views of a manufacturing process of a touch panel according to an embodiment of the disclosure.

FIG. 10A to FIG. 10D are schematic top views of a manufacturing process of a touch panel according to an embodiment of the disclosure. FIG. 11A to FIG. 11C are schematic cross-sectional views along lines A-A' and B-B' depicted in FIG. 10A to FIG. 10C, respectively. Referring to FIG. 10A and FIG. 11A, wherein the figures are similar to FIG. 8D and FIG. 9D. In the present embodiment, some of the first sensing strings 120 are connected to the first conductive lines 220.

Figure 10B:
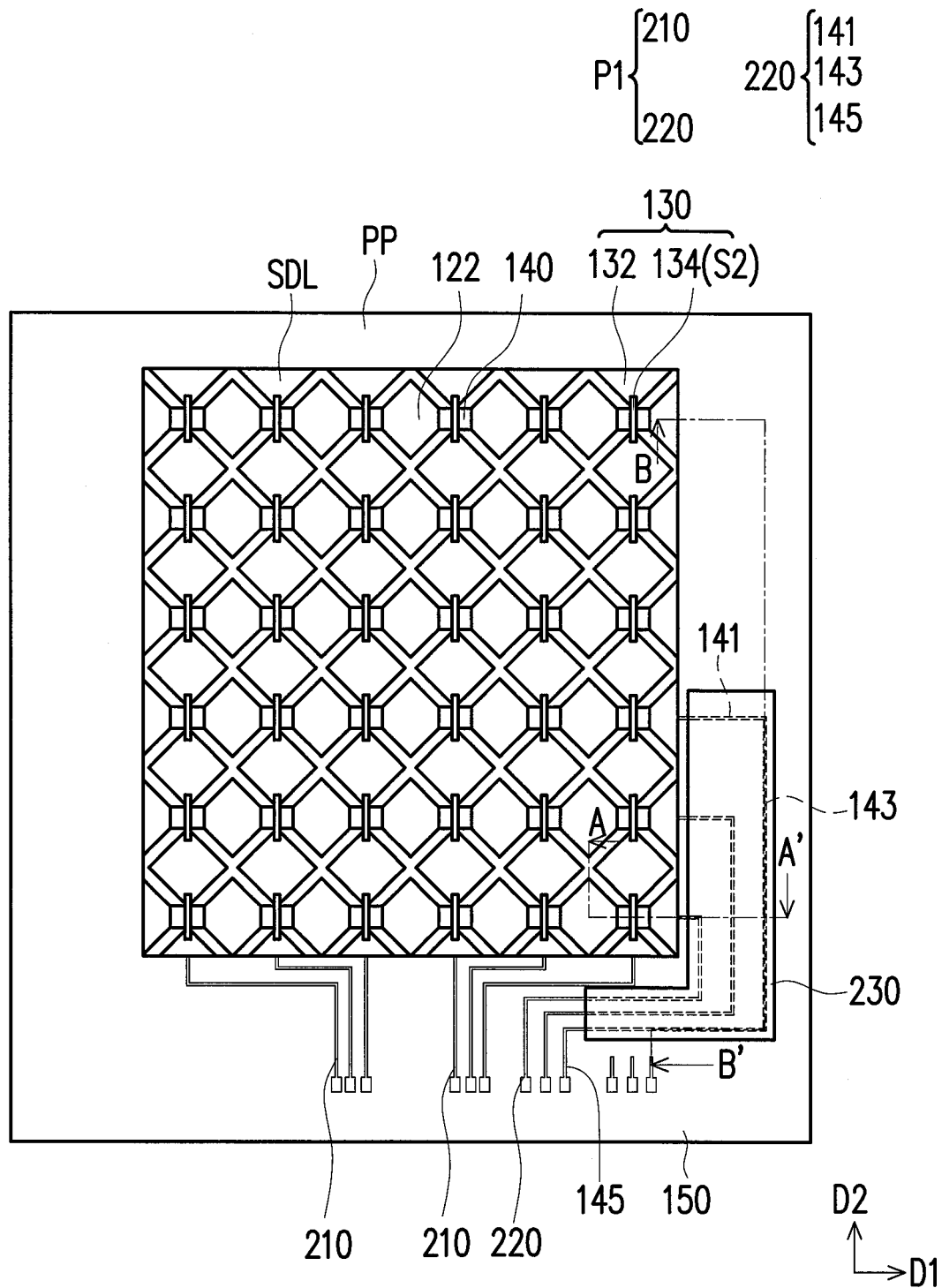
Figure 11A:
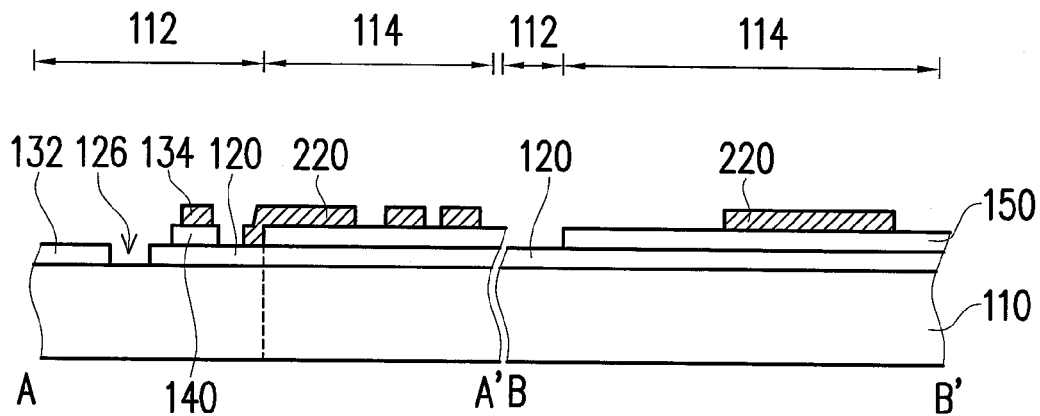
FIG. 11A to FIG. 11C are schematic cross-sectional views along lines A-A' and B-B' depicted in FIG. 10A to FIG. 10C, respectively.
Figure 11B:
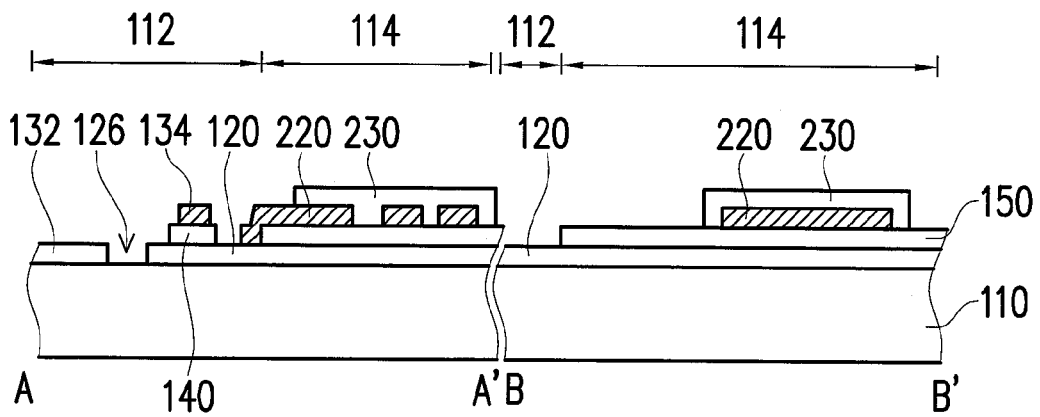
Figure 11C:
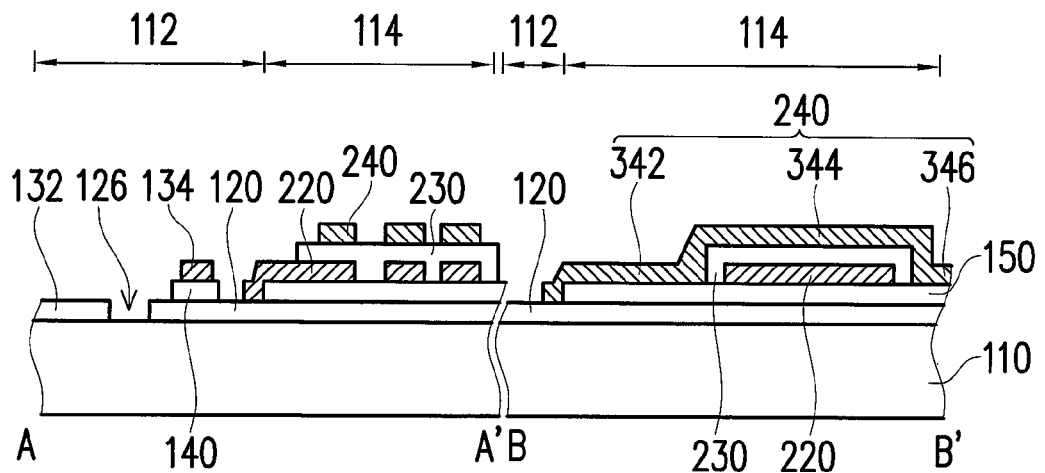

Referring to FIG. 10B and FIG. 11B, a insulating layer 230 is formed on the periphery region 114. The insulating layer 230 covers the first conductive lines 220. A material of the insulating layer 230 is, for example, a photosensitive resin or a thermoset resin.

Figure 10C:
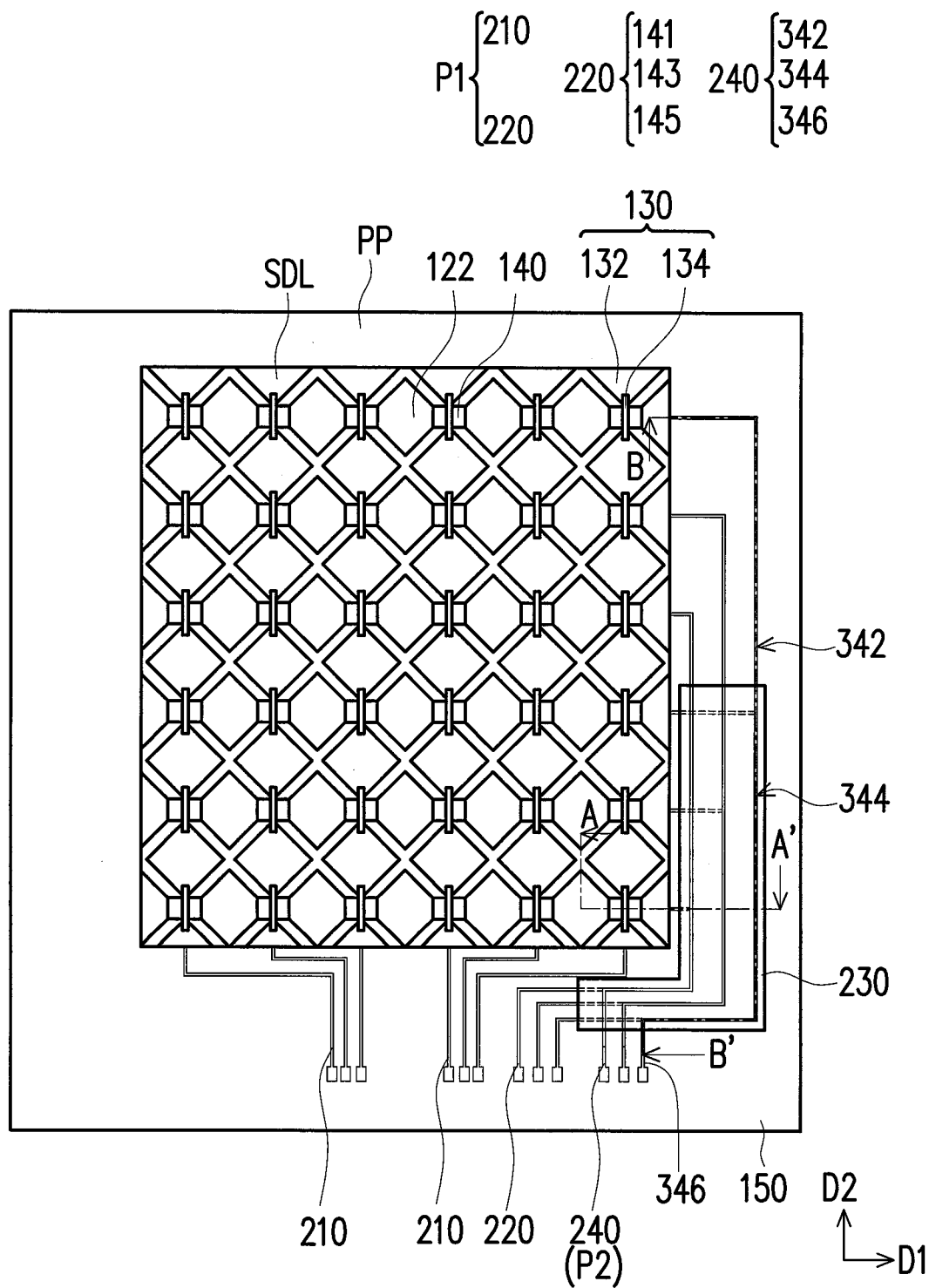

Referring to FIG. 10C and FIG. 11C, a second periphery conductive layer P2 is formed on the periphery region 114. The second periphery conductive layer P2 includes at least one second conductive line 240. The first conductive lines 220 and the second conductive lines 240 are electrically insulated to each other. A portion of the second conductive line 240 is disposed on the insulating layer 230 located above the first conductive lines 220. The second conductive line 240 is electrically connected to one of the first sensing strings 120 and may be electrically connected to an electronic device, such as a circuit board 300 shown in FIG. 10D, in subsequent processes. The second conductive line 240 may transmit a sensing signal of the corresponding first sensing string 120 to the electronic device. The second conductive lines 240 and the first conductive lines 220 are electrically connected to different first sensing strings 120.

Referring to FIG. 10C and FIG. 11C, the second conductive line 240 includes a fourth connection portion 342, a fourth transmission portion 344 and a fourth fan-in portion 346. The fourth connection portion 342 is disposed on the insulating layer 230 and electrically connected to one of the first sensing strings 120. The fourth transmission portion 344 is disposed on the insulating layer 230 and the fourth transmission portion 344 is disposed to overlap with the first conductive line 220. The fourth transmission portion 344 and the first conductive line 220 are electrically insulated to each other by the insulating layer 230. The fourth fan-in portion 346 is disposed on the first insulating layer 150. The fourth transmission portion 344 is connected between the fourth connection portion 342 and the fourth fan-in portion 346. The fourth fan-in portion 346 may be electrically connected to the electronic device, such as a circuit board 300 shown in FIG. 10D, in subsequent processes. In the present embodiment, the fourth fan-in portion 346 may be manufactured with the fourth connection portion 342 and the fourth transmission portion 344 at the same process step to include the same material. However, the disclosure is not limited thereto. In other embodiments, the fourth connection portion 342 and the fourth transmission portion 344 may be manufactured in advance. Thereafter, the fourth fan-in portion 346 may be manufactured by using a different material. For instance, the fourth connection portion 342 and the fourth transmission portion 344 may be manufactured by using the conductive silver through the screen printing. The fourth fan-in portion 346 may be manufactured by using the copper metal through the photolithography process. The fourth fan-in portions 346 between the second conductive lines 240 may include a relatively smaller line width and a relatively smaller line interval to accomplish a more preferable fan-in effect for the conductive lines, thereby connecting all periphery conductive lines into the electronic device, such as a circuit board 300 shown in FIG. 10D.

In the present embodiment, at the border of the periphery pattern PP and the sensing device layer SDL, the second conductive line 240 bridges over to the layer where the first sensing string 120 is located. In other words, the fourth connection portion 342 of the second conductive lines 240 travels down to another layer at the border in order to be electrically connected to the sensing device layer SDL. In addition, the fourth fan-in portion 346 of the second conductive lines 240 travels down to another layer at the border of the insulating layer 230.

Figure 10D:
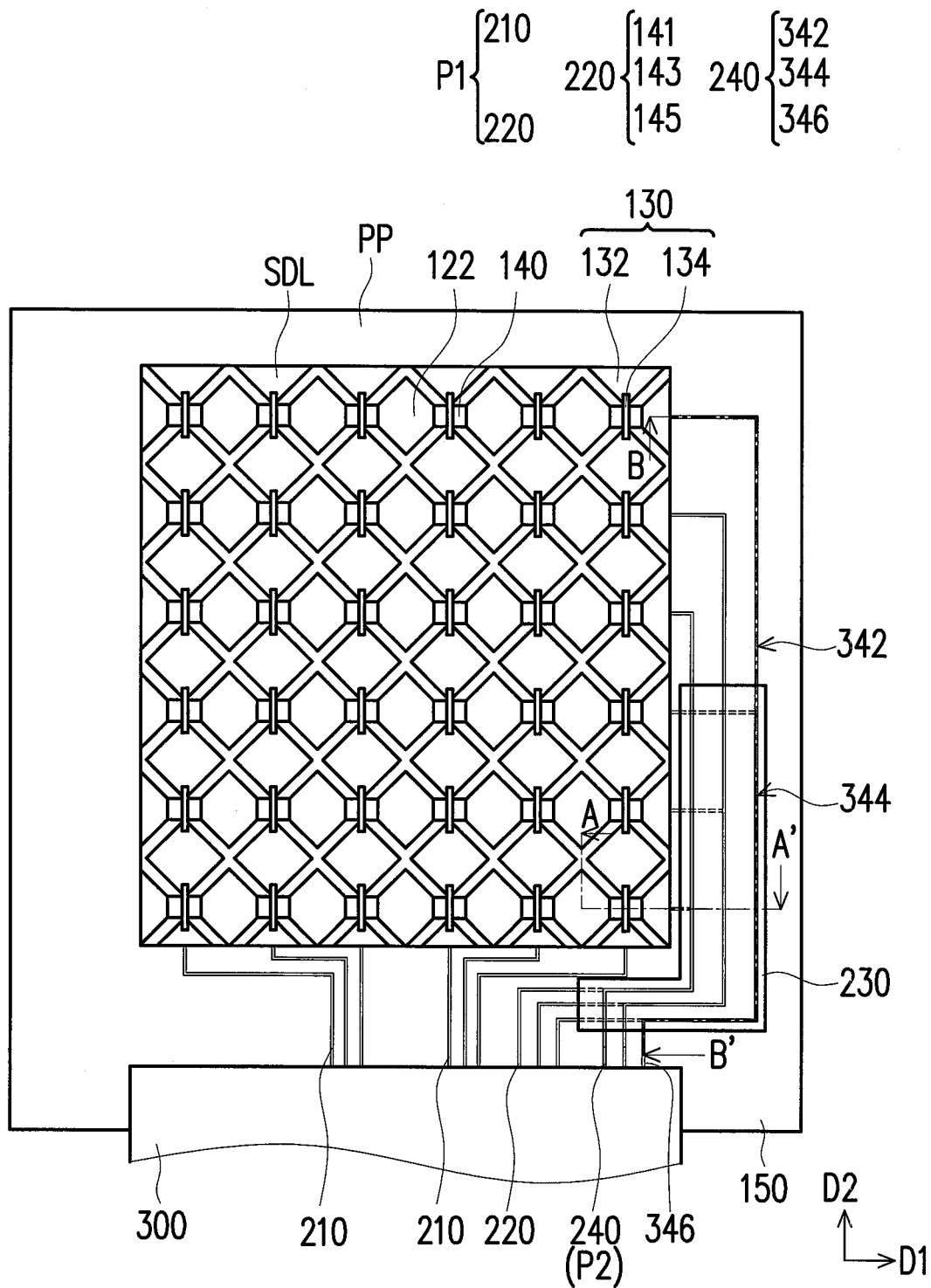

In the present embodiment, the second conductive line 240 is divided into, for example, the fourth connection portion 342 electrically connected to the first sensing string 120, the fourth fan-in portion 346 electrically connected to the electronic device, such as a circuit board 300 shown in FIG. 10D, and the fourth transmission portion 344 connected between the fourth connection portion 342 and the fourth fan-in portion 346. Therein, the fourth transmission portion 344 and the fourth connection portion 342 are disposed on different layers, and the fourth transmission portion 344 and the fourth fan-in portion 346 are disposed on different layers. The fourth transmission portion 344 may refer to as a layer-crossing structure. With disposition of the insulating layer 230 and the layer-crossing structure, a stack structure may be formed by disposing a portion of the second conductive line 240 above the first conductive line 220. The stack structure of the periphery conductive lines may reduce a distributing area of the first conductive lines 220 and the second conductive lines 240 in the periphery region 114, so as to reduce an area of the periphery region 114 of a touch panel 10. When the touch panel 10 of the present embodiment is disposed on a touch display panel 1 of FIG. 1, the design requirements in slim bezel for the touch display panel 1 may be satisfied.

A material of the second periphery conductive layer P2 is, for example, a conductive material containing metal or other appropriate conductive materials. The conductive material containing metal is, for example, a conductive silver paste, a copper metal, or a stacked layer of Mo/Al—Mo. However, the disclosure is not limited thereto. In other embodiments, the material of the second periphery conductive layer P2 may be identical to the material of the first sensing conductive layer S1. A method of forming the second periphery conductive layer P2 includes, for example, a photolithography process, a screen printing, an ink-jet printing, a transfer printing, or a roll to roll printing process. The sensing conductive lines 210 may be formed in the manufacturing process of the second periphery conductive layer P2. In other words, the sensing conductive lines 210 may be selectively formed in the manufacturing process of the first periphery conductive layer P1 or in the manufacturing process of the second periphery conductive layer P2, and the disclosure is not limited thereto.

Figure 12:
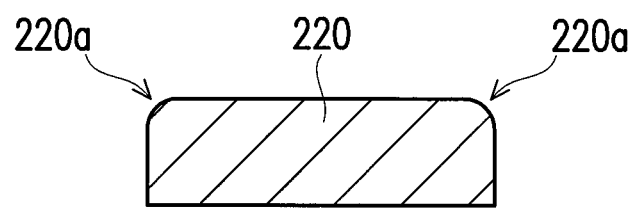
FIG. 12 is a schematic cross-sectional view of a conductive line.

FIG. 12 is a schematic cross-sectional view of a conductive line. The manufacturing method of the conductive line, for example, the first conductive line 220 includes a photolithography process, a screen printing, an ink jet printing, a transfer printing, or a roll to roll printing process. When using the screen printing, the ink-jet printing, the transfer printing, or the roll to roll printing process, the corner of the cross-section of the line is a round corner 220a, as shown in FIG. 12. Such process can yield a more smooth and uniform line trace. The first conductive line 220 is used as an example to demonstrate the round corner 220a herein. In other embodiment, the second conductive lines 240 and the sensing conducive lines 210 may also include the round corner 220a feature when they are being fabricated using screen printing, ink jet printing, transfer printing, or roll to roll printing process, and the disclosure is not limited thereto.

In the touch panel of an embodiment of the disclosure, at least one first conductive line and at least one second conductive line are disposed on the periphery region, in which an insulating layer is provided between the first conductive line and the second conductive line to form a stack structure of the periphery conductive lines. Said stack structure may reduce the distributing area of conductive lines in the periphery region of the touch panel, so as to satisfy the design requirements in slim bezel for the touch display panel disposed with said touch panel.

In the touch panel of an embodiment of the disclosure, covering a periphery pattern located in the periphery region with a first insulating layer can reduce the laser process time to enhance the effectiveness of the process.

What is claimed is:

1. A touch panel, comprising:
   a substrate having a sensing region and a periphery region surrounding the sensing region;
   at least one first conductive line disposed on the periphery region, wherein a portion of the at least one first conductive line extends along a first direction and another portion of the at least one first conductive line extends along a second direction, and the first direction and the second direction are perpendicular to each other;
   an insulating layer disposed on the periphery region and covering the first conductive line;
   a first sensing conductive layer disposed on the sensing region, and the first sensing conductive layer comprising:
      a plurality of first sensing strings electrically insulated from one another; and
   at least one second conductive line disposed on the periphery region, and the first conductive line and the second conductive line being electrically insulated from each other, wherein a portion of the at least one second conductive line is disposed on the insulating layer located above the first conductive line, a portion of the at least one second conductive line extending along the second direction is overlapped with the another portion of the at least one first conductive line extending along the second direction, and the second conductive line comprises:
      a first connection portion disposed on the substrate and electrically connected to the first sensing string;
      a first transmission portion disposed on the insulating layer above the first conductive line; and
      a first fan-in portion disposed on the substrate, wherein the first transmission portion is connected between the first connection portion and the first fan-in portion, the first fan-in potion has a smaller line width and line interval compared to the first connection portion and the first transmission portion.

2. The touch panel of claim 1, wherein the first sensing conductive layer further comprises a plurality of second sensing pads:

the first sensing string comprises a plurality of first sensing pads and a plurality of first bridging lines, wherein the first bridging line is electrically connected to the two adjacent first sensing pads, and the touch panel further comprises:

a second sensing conductive layer disposed on the sensing region, and the second sensing conductive layer comprising:

a plurality of second bridging lines, wherein each of the second bridging lines is electrically connected to the two adjacent second sensing pads to form a plurality of second sensing strings, the second sensing strings are electrically insulated from one another, and the first sensing strings and the second sensing strings are electrically insulated to each other.

3. The touch panel of claim 2, further comprising a plurality of insulation patterns, and the insulation pattern being disposed between the corresponding first bridging line and the second bridging line.

4. The touch panel of claim 3, wherein the insulation patterns and the insulating layer are disposed on an identical layer.

5. The touch panel of claim 2, wherein the first sensing string, the second sensing pad, and the first conductive lines are disposed on an identical layer.

6. The touch panel of claim 2, wherein the second bridging line and the second conductive lines are disposed on an identical layer.

7. The touch panel of claim 2, further comprising at least one sensing conductive line disposed on the periphery region, and the sensing conductive line being electrically connected to the second sensing string.

8. The touch panel of claim 1, wherein the periphery region comprises a first region and a second region respectively disposed on two opposite sides of the sensing region, the first conductive line and the second conductive line are disposed on the first region, and the touch panel further comprises:

at least one third conductive line disposed on the second region, wherein the third conductive line and the corresponding first conductive line are connected to the same first sensing string, and the third conductive line is covered by the insulating layer; and at least one fourth conductive line disposed on the second region, wherein a portion of the fourth conductive line is disposed on the insulating layer above the third conductive line, and the fourth conductive line and the second conductive line are connected to the same first sensing string.

9. The touch panel of claim 8, wherein the fourth conductive line comprises:

a second connection portion disposed on the substrate and electrically connected to the first sensing string;

a second transmission portion disposed on the insulating layer above the third conductive line; and a second fan-in portion disposed on the substrate, wherein the second transmission portion is connected between the second connection portion and the second fan-in portion.

10. The touch panel of claim 1, wherein the first transmission portion and the first conductive line are overlapped with each other.

11. The touch panel of claim 1, wherein the first transmission portion and the first conductive line are staggered to each other.

12. A touch display panel, comprising:

the touch panel as recited in claim 1; and a display panel, wherein the touch panel is disposed on the display panel, and the touch panel and the display panel are assembled together.

13. A manufacturing method of a touch panel, comprising:

providing a substrate, and the substrate having a sensing region and a periphery region surrounding the sensing region;

forming at least one first conductive line on the periphery region, wherein a portion of the at least one first conductive line extends along a first direction and another portion of the at least one first conductive line extends along a second direction, and the first direction and the second direction are perpendicular to each other;

forming an insulating layer on the periphery region, and the insulating layer covering the first conductive line;

forming a first sensing conductive layer on the sensing region, the first sensing conductive layer comprising a plurality of first sensing strings and the first sensing strings being electrically insulated from one another; and forming at least one second conductive line on the periphery region, and the first conductive line and the second conductive line being electrically insulated to each other, wherein a portion of the at least one second conductive line is disposed on the insulating layer located above the first conductive line, a portion of the at least one second conductive line extending along the second direction is overlapped with the another portion of the at least one first conductive line extending along the second direction, and the second conductive line comprises:

a first connection portion disposed on the substrate and electrically connected to the first sensing string;

a first transmission portion disposed on the insulating layer above the first conductive line; and a first fan-in portion disposed on the substrate, wherein the first transmission portion is connected between the first connection portion and the first fan-in portion, the first fan-in potion has a smaller line width and line interval compared to the first connection portion and the first transmission portion.

14. The manufacturing method of the touch panel of claim 13, wherein the first sensing conductive layer further comprises a plurality of second sensing pads, the first sensing string comprises a plurality of first sensing pads and a plurality of first bridging lines, the first bridging line is electrically connected to the two adjacent first sensing pads, and the manufacturing method of the touch panel further comprises:

forming a second sensing conductive layer on the sensing region, the second sensing conductive layer comprising a plurality of second bridging lines, each of the second bridging lines being electrically connected to the two adjacent second sensing pads, and the second sensing pads and the second bridging lines being serially connected to form a plurality of second sensing strings.

15. The manufacturing method of the touch panel of claim 14, further comprising forming a plurality of insulation patterns on the sensing region, the insulation patterns covering the first bridging lines, and the second bridging line crossing over one of the insulation patterns to electrically connect to the two adjacent second sensing pads.

16. The manufacturing method of the touch panel of claim 15, wherein the insulation patterns and the insulating layer are manufactured at the same process step.

17. The manufacturing method of the touch panel of claim 14, wherein the second sensing conductive layer and the second conductive lines are manufactured at the same process step.

18. The touch panel of claim 14, further comprising forming a plurality of sensing conductive lines on the periphery region, and the sensing conductive line being electrically connected to one of the second sensing strings.

19. The manufacturing method of the touch panel of claim 13, wherein the periphery region comprises a first region and a second region respectively disposed on two opposite sides of the sensing region, the first conductive lines and the second conductive lines are disposed on the first region, and the touch panel further comprises:
- at least one third conductive line disposed on the second region, wherein the third conductive line and the corresponding first conductive line are connected to the same first sensing string, and the insulating layer covers the third conductive line; and
- at least one fourth conductive line disposed on the second region, wherein a portion of the fourth conductive line is disposed on the insulating layer above the third conductive line, and the fourth conductive line and the second conductive line are connected to the same first sensing string.

20. The manufacturing method of the touch panel of claim 19, wherein the fourth conductive line comprises:
- a second connection portion disposed on the substrate and electrically connected to the first sensing string;
- a second transmission portion disposed on the insulating layer above the third conductive line; and
- a second fan-in portion disposed on the substrate, wherein the second transmission portion is connected between the second connection portion and the second fan-in portion.

21. The manufacturing method of the touch panel of claim 13, wherein the first sensing conductive layer and the first conductive lines are manufactured at the same process step.

* * * * *